United States Patent
Tan

(10) Patent No.: US 8,726,188 B2
(45) Date of Patent: May 13, 2014

(54) METHOD FOR PRESENTING INFORMATION TO A HOST VEHICLE HAVING A USER INTERFACE

(75) Inventor: Adrian Tan, Northville, MI (US)

(73) Assignee: Nissan North America, Inc., Franklin, TN (US)

( * ) Notice: Subject to any disclaimer, the term of this patent is extended or adjusted under 35 U.S.C. 154(b) by 323 days.

(21) Appl. No.: 12/916,223

(22) Filed: Oct. 29, 2010

(65) Prior Publication Data

US 2012/0110465 A1    May 3, 2012

(51) Int. Cl.
*G06F 3/048* (2013.01)
*G06F 3/01* (2006.01)

(52) U.S. Cl.
USPC ........... 715/810; 715/716; 715/727; 715/733; 715/764; 701/29.1

(58) Field of Classification Search
USPC ......... 715/700, 716, 727, 733, 751, 764, 765, 715/771, 781, 810, 835, 846, 864; 701/1, 701/24, 29.1, 31.4, 31.5
See application file for complete search history.

(56) References Cited

U.S. PATENT DOCUMENTS

| | | | |
|---|---|---|---|
| 6,009,355 A | 12/1999 | Obradovich et al. | |
| 6,131,060 A | 10/2000 | Obradovich et al. | |
| 6,175,782 B1 | 1/2001 | Obradovich et al. | |
| 6,233,506 B1 | 5/2001 | Obradovich et al. | |
| 6,275,231 B1 | 8/2001 | Obradovich | |
| 6,282,464 B1 | 8/2001 | Obradovich | |
| 6,330,497 B1 | 12/2001 | Obradovich et al. | |
| 6,438,465 B2 | 8/2002 | Obradovich et al. | |
| 6,449,535 B1 | 9/2002 | Obradovich et al. | |
| 6,459,961 B1 | 10/2002 | Obradovich et al. | |
| 6,542,794 B2 | 4/2003 | Obradovich | |
| 6,542,795 B2 | 4/2003 | Obradovich et al. | |
| 6,577,928 B2 | 6/2003 | Obradovich | |
| 6,587,758 B2 | 7/2003 | Obradovich et al. | |
| 6,587,759 B2 | 7/2003 | Obradovich et al. | |
| 6,703,944 B1 | 3/2004 | Obradovich | |
| 6,859,687 B2 | 2/2005 | Obradovich et al. | |
| 6,907,416 B2 * | 6/2005 | Tasooji et al. ................... | 706/50 |
| 6,922,616 B2 | 7/2005 | Obradovich et al. | |
| 6,933,842 B2 | 8/2005 | Oesterling et al. | |
| 6,950,649 B2 | 9/2005 | Videtich | |
| 6,971,070 B2 | 11/2005 | Obradovich | |
| 6,975,932 B2 | 12/2005 | Obradovich | |

(Continued)

FOREIGN PATENT DOCUMENTS

| | | |
|---|---|---|
| EP | 0956219 B1 | 6/2008 |
| EP | 1008133 B1 | 7/2008 |

(Continued)

OTHER PUBLICATIONS

U.S. Office Action of corresponding U.S. Appl. No. 12/916,241, dated on Jan. 24, 2013.

*Primary Examiner* — Xiomar L Bautista
(74) *Attorney, Agent, or Firm* — Global IP Counselors, LLP

(57) ABSTRACT

A method for presenting information to a host vehicle having a user interface. The method comprises remotely creating an information set including user accessible information pertaining to troubleshooting onboard components of the host vehicle, wirelessly communicating a portion of the information set to the host vehicle, and operating the user interface to selectively make available the user accessible information in the portion of the information set for access at the host vehicle.

20 Claims, 19 Drawing Sheets

(56) References Cited

U.S. PATENT DOCUMENTS

| | | | |
|---|---|---|---|
| 6,985,089 B2* | 1/2006 | Liu et al. .................. | 340/903 |
| 7,031,724 B2 | 4/2006 | Ross et al. | |
| 7,043,699 B2 | 5/2006 | Obradovich | |
| 7,062,362 B2 | 6/2006 | Obradovich et al. | |
| 7,124,004 B2 | 10/2006 | Obradovich | |
| 7,142,101 B2 | 11/2006 | Morris | |
| 7,162,370 B2 | 1/2007 | Obradovich | |
| 7,171,291 B2 | 1/2007 | Obradovich | |
| 7,233,814 B2* | 6/2007 | Wissinger et al. ......... | 455/569.2 |
| 7,251,789 B2 | 7/2007 | Obradovich | |
| 7,280,900 B2 | 10/2007 | Gault et al. | |
| 7,312,697 B2 | 12/2007 | Veliu et al. | |
| 7,400,954 B2 | 7/2008 | Sumcad et al. | |
| 7,463,951 B2 | 12/2008 | Ampunan et al. | |
| 7,480,550 B2 | 1/2009 | Huber et al. | |
| 7,499,778 B2 | 3/2009 | Obradovich | |
| 7,512,495 B2 | 3/2009 | Obradovich | |
| 7,519,922 B2 | 4/2009 | Obradovich | |
| 7,522,980 B2 | 4/2009 | Watkins et al. | |
| 7,526,246 B2 | 4/2009 | Videtich | |
| 7,532,859 B2 | 5/2009 | Videtich | |
| 7,545,262 B2 | 6/2009 | Batchik | |
| 7,551,063 B2 | 6/2009 | Inbarajan | |
| 7,616,943 B2 | 11/2009 | Oesterling | |
| 7,656,310 B2 | 2/2010 | Obradovich | |
| 7,684,910 B2 | 3/2010 | Inbarajan | |
| 7,741,959 B2 | 6/2010 | Obradovich | |
| 7,756,616 B2 | 7/2010 | Helm | |
| 8,194,133 B2* | 6/2012 | DeWind et al. ............ | 348/148 |
| 2001/0020202 A1 | 9/2001 | Obradovich et al. | |
| 2001/0021887 A1 | 9/2001 | Obradovich et al. | |
| 2001/0029410 A1 | 10/2001 | Obradovich | |
| 2002/0008718 A1 | 1/2002 | Obradovich | |
| 2002/0054159 A1 | 5/2002 | Obradovich | |
| 2002/0055811 A1 | 5/2002 | Obradovich | |
| 2002/0065585 A1 | 5/2002 | Obradovich | |
| 2002/0082751 A1 | 6/2002 | Obradovich et al. | |
| 2002/0082752 A1 | 6/2002 | Obradovich | |
| 2002/0103583 A1* | 8/2002 | Ohmura et al. ............ | 701/33 |
| 2002/0156555 A1 | 10/2002 | Obradovich et al. | |
| 2002/0198635 A1 | 12/2002 | Obradovich et al. | |
| 2003/0004616 A1 | 1/2003 | Obradovich et al. | |
| 2003/0139871 A1 | 7/2003 | Miller et al. | |
| 2003/0139882 A1 | 7/2003 | Miller et al. | |
| 2003/0144775 A1 | 7/2003 | Klausner | |
| 2004/0162645 A1 | 8/2004 | Obradovich et al. | |
| 2004/0162646 A1 | 8/2004 | Obradovich et al. | |
| 2004/0176880 A1 | 9/2004 | Obradovich et al. | |
| 2004/0178902 A1* | 9/2004 | Koike et al. ................ | 340/457.1 |
| 2005/0038581 A1 | 2/2005 | Kapolka et al. | |
| 2005/0080528 A1 | 4/2005 | Obradovich | |
| 2005/0137763 A1 | 6/2005 | Watkins et al. | |
| 2006/0031783 A1 | 2/2006 | Obradovich | |
| 2006/0106522 A1 | 5/2006 | Obradovich | |
| 2006/0195232 A1 | 8/2006 | Obradovich | |
| 2006/0200285 A1 | 9/2006 | Obradovich | |
| 2006/0200781 A1 | 9/2006 | Obradovich | |
| 2006/0200782 A1 | 9/2006 | Obradovich | |
| 2006/0212832 A1 | 9/2006 | Obradovich | |
| 2006/0238320 A1 | 10/2006 | Veliu et al. | |
| 2006/0242580 A1 | 10/2006 | Obradovich | |
| 2006/0258377 A1 | 11/2006 | Economos et al. | |
| 2006/0276184 A1 | 12/2006 | Tretyak et al. | |
| 2006/0277495 A1 | 12/2006 | Obradovich | |
| 2007/0038338 A1* | 2/2007 | Larschan et al. ........... | 701/2 |
| 2007/0112476 A1 | 5/2007 | Obradovich | |
| 2007/0129064 A1 | 6/2007 | Batchik | |
| 2007/0171029 A1 | 7/2007 | Inbarajan | |
| 2007/0173992 A1 | 7/2007 | McCutchen et al. | |
| 2007/0179706 A1 | 8/2007 | McCutchen et al. | |
| 2007/0179798 A1 | 8/2007 | Inbarajan | |
| 2007/0179799 A1 | 8/2007 | Laghrari | |
| 2007/0179800 A1 | 8/2007 | Oesterling | |
| 2007/0299575 A1* | 12/2007 | Yamada et al. ............ | 701/29 |
| 2008/0021964 A1 | 1/2008 | Inbarajan | |
| 2008/0023254 A1 | 1/2008 | Prost-Fin et al. | |
| 2008/0027604 A1 | 1/2008 | Oesterling | |
| 2008/0027606 A1 | 1/2008 | Helm | |
| 2008/0033635 A1 | 2/2008 | Obradovich et al. | |
| 2008/0089298 A1* | 4/2008 | Anschutz et al. ........... | 370/338 |
| 2009/0012675 A1 | 1/2009 | Laghrari et al. | |
| 2009/0177351 A1 | 7/2009 | Watkins et al. | |
| 2010/0070932 A1 | 3/2010 | Hur | |
| 2010/0161167 A1 | 6/2010 | Leyerle | |
| 2011/0298614 A1* | 12/2011 | Bells ......................... | 340/539.13 |

FOREIGN PATENT DOCUMENTS

| | | | |
|---|---|---|---|
| JP | 2004-326689 A | 11/2004 | |
| WO | WO-2007/079417 A2 | 7/2007 | |
| WO | WO-2007/079418 A2 | 7/2007 | |
| WO | WO-2007/079419 A2 | 7/2007 | |
| WO | WO-2007/079420 A2 | 7/2007 | |

* cited by examiner

METHOD FOR PRESENTING INFORMATION TO A HOST VEHICLE HAVING A USER INTERFACE

BACKGROUND

1. Field of the Invention

The present invention generally relates to a method for presenting information to a host vehicle having a user interface. More particularly, the present invention relates to a method using telematics to provide to a host vehicle user accessible information pertaining to troubleshooting onboard components of the host vehicle.

2. Background Information

Instructional guides for a vehicle and its components generally include owner's manuals, quick reference guides, instructional CDs and DVDs, hang-tags, placards and so on. However, users often ignore these guides, and since the content in the guides may be finalized before the vehicle is sold, the information may be outdated.

Electronic owner's manuals are being created to supplement or replace the printed owner's manuals for automobiles and other vehicles. For example, a preloaded on-board service manual provides text or audio instructions upon an error event or user inquiry. A vehicle human machine interface (HMI) system that provides central control over many vehicle functions can include a quick tips button that links to additional text, audio, or visual content to provide help with a particular HMI screen or vehicle function. Also, a system can collect vehicle condition information to provide maintenance reminders, such as email notifications based on user preferences, dates, and vehicle condition information, and users can be notified of recalls through recall notices issued through, for example, a telematics system. In addition, such systems can provide assistance for a specific vehicle system function when the user selects a help key and then operates a user controller to identify the function for which help is sought. Furthermore, electronic control unit (ECU) software can be updated by downloading new software from a telematics system, and overwriting the old ECU software.

Regardless of whether the owner's manual is printed or electronic, a vehicle user will typically refer to the "frequently asked questions" or quick troubleshooting guide section of a printed owner's manual for quick and simple solutions to an issue with the vehicle. Additionally, users typically choose to have their vehicle serviced by a dealer or mechanic when any ongoing vehicle issue arises, instead of consulting with the owner's manual. Also, owner's manuals fail to address issues with the vehicle that were unforeseen when the owner's manual was prepared unless they are updated or supplemented. Nevertheless, users generally can be expected to neglect the owner's manual even with the availability of a telematics infrastructure for updating an owner's manual.

SUMMARY

It has been discovered that a need exists for a vehicle owner's manual that is capable of informing the vehicle users of newly discovered issues with the vehicle and presenting solutions to these issues that have been approved by, for example, the original equipment manufacturer (OEM).

In view of the state of the known technology, one aspect of the present invention provides a method for presenting information to a host vehicle having a user interface. The method comprises remotely creating an information set including user accessible information pertaining to troubleshooting onboard components of the host vehicle, wirelessly communicating a portion of the information set to the host vehicle, and operating the user interface to selectively make available the user accessible information in the portion of the information set for access at the host vehicle.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
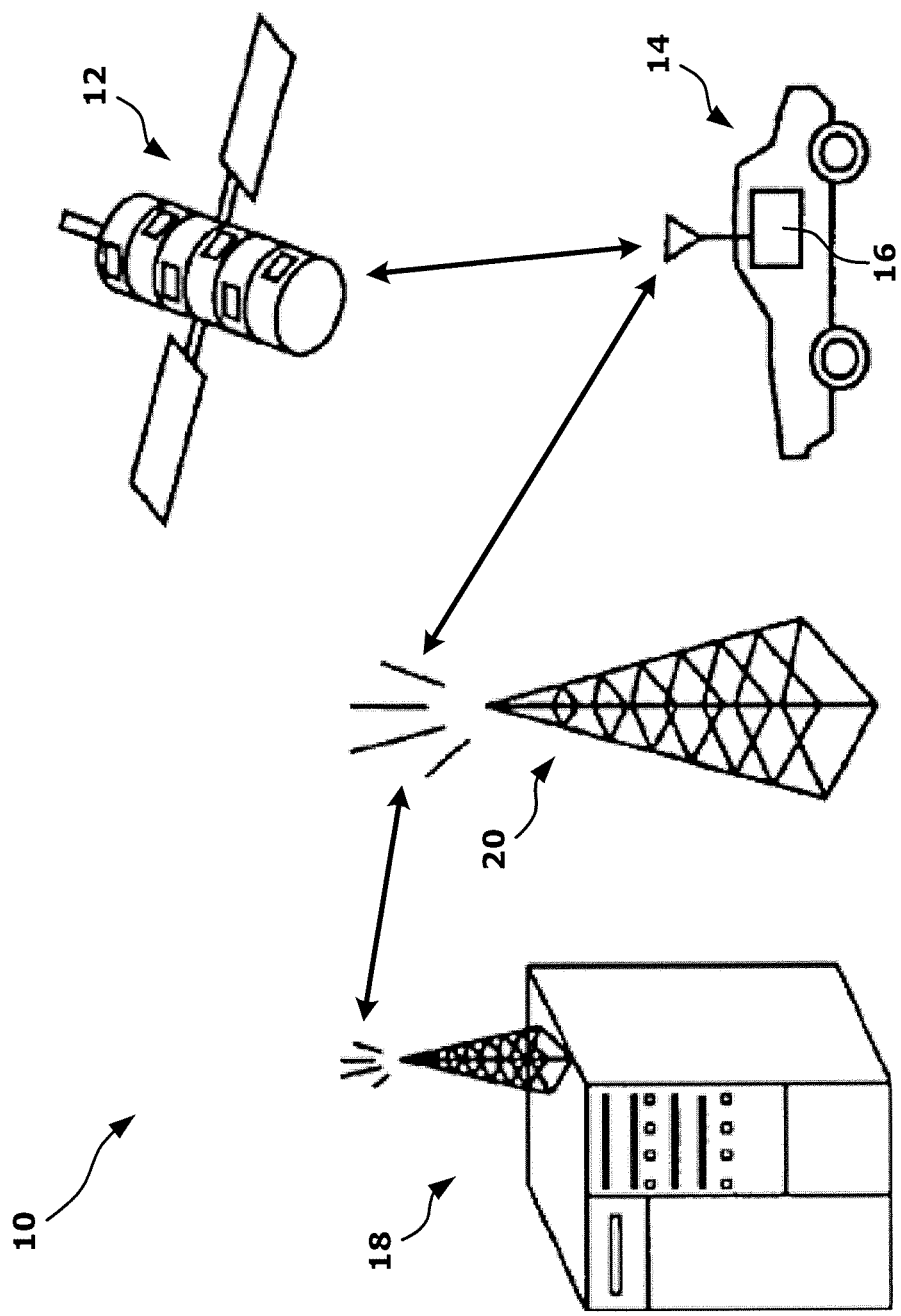
FIG. 1 is a schematic diagram of an exemplary telematics system discussed herein.

FIG. 1 illustrates a schematic diagram of an exemplary telematics system 10 that can be used to provide information, such as an information set of vehicle issues and possible solutions, to a host vehicle as discussed herein. Hence, the telematics system 10 can generally be referred to as an information system. The telematics system 10 in this example includes one or more satellites 12, which can be geosynchronous orbit (GEO) satellites, high earth orbit (HEO), medium earth orbit (MEO), low earth orbit (LEO) satellites, or any other suitable type of satellites or combinations of satellites. Typically, the satellites 12 provide global positioning system (GPS) data for use by a vehicle 14, such as an automobile, to enable the vehicle 14 to identify its location as discussed in more detail below. The vehicle 14 includes an HMI system 16 as shown in more detail in FIG. 2 and discussed below. For purposes of this example and discussion, only one vehicle 14 is shown, and is referred to as a "host vehicle." Naturally, the telematics system 10 is useable with a plurality of vehicles of different makes and models.

The telematics system 10 further includes at least one base station 18 that includes, for example, a server for collecting, storing and distributing information as discussed herein. The HMI system 16 of the vehicle can communicate directly with the satellites 12, and can communicate with the base stations 18 directly or via one or more routers or repeaters 20. The communications in the telematics system 10 can be radio frequency (RF) communications, microwave communications, packet-switched networking or any other type of communications known in the art. Furthermore, as understood in the art, the HMI system 16 can connect to, for example, a cellular telephone (e.g., via Bluetooth or tethering), a computer device, or any other suitable communications device, to communicate with and access the telematics system 10, the Internet and any other off board location.

Figure 2:
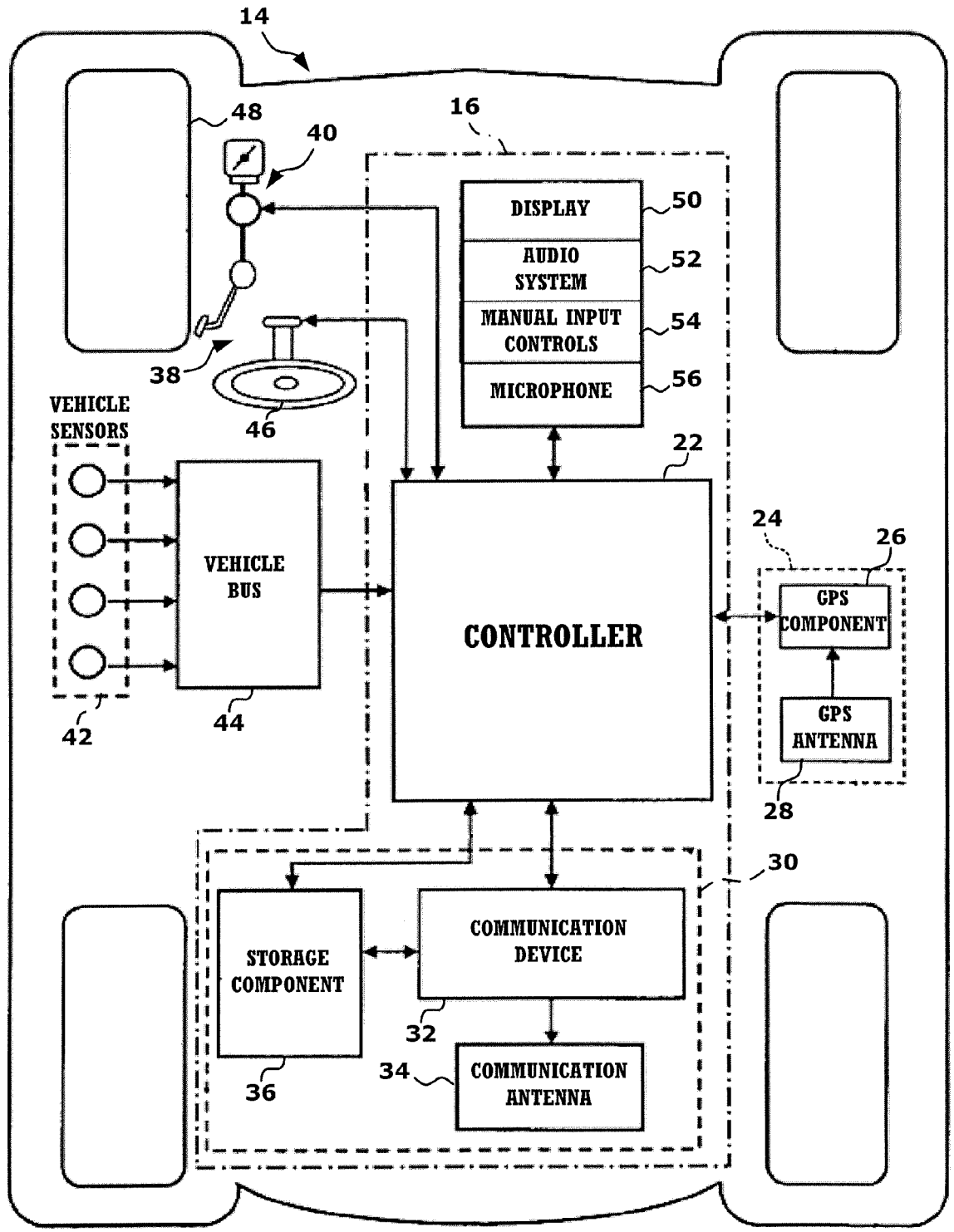
FIG. 2 is a schematic diagram of an exemplary HMI system employed in a vehicle as discussed herein.

As shown in FIG. 2, the HMI system 16 includes a controller 22 that controls the components of the HMI system 16. As understood by one skilled in the art, the controller 22 preferably includes a microcomputer with a control program that controls the HMI system 16 as discussed herein. The controller 22 can also include other conventional components such as an input interface circuit, an output interface circuit, and storage devices such as a ROM (Read Only Memory) device and a RAM (Random Access Memory) device. The RAM and ROM store processing results and control programs that are run by the controller 22. The controller 22 is operatively coupled to the components of the HMI system 16, and to the components of the vehicle 14 as appropriate, in a conventional manner. It will be apparent to those skilled in the art from this disclosure that the precise structure and algorithms for the controller 22 can be any combination of hardware and software that will carry out the functions of the embodiments discussed herein.

The controller 22 communicates with a location determining component 24 on the vehicle 14. In this example, the location determining component 24 includes a GPS component 26 and a GPS antenna 28. The GPS component 26 communicates with one or more of the satellites 12 via the GPS antenna 28 on the vehicle 14 to receive, for example, GPS data in a manner as understood in the art. Accordingly, the GPS component 24 determines the location of the vehicle 14 based on the GPS data, for example, and communicates information pertaining to the location of the vehicle to controller 22. Also, the vehicle location determining component 24 can use cellular phone or personal digital assistant (PDA) GPS location information that is transmitted via the phone or PDA to the vehicle location determining component 24 by, for example, Bluetooth or any other suitable technology if, for instance, GPS technology is not available in the vehicle components. The vehicle location determining component 24 is also configured to use, for example, dead-reckoning and map matching to determine vehicle location, as well as time-zone date to determine the regional location of the vehicle as understood in the art.

The controller 22 further communicates with one or more communication component 30 on the vehicle 14. In this example, the communication component 30 includes a communication device 32, such as a transceiver as known in the art, a communication antenna component 34, and a storage component 36. The controller 22 can communicate with, for example, a base station 18 via the communication device 32 and communication antenna component 34. The communication device 32 and communication antenna component 34 can be further configured to communicate with the satellites 12 to transmit information between, for example, a base station 18 and the controller 22 via a satellite 12. Also, the communication component 30 can be controlled by controller 22 to communicate with a mobile device, such as a wireless telephone, personal digital assistant (PDA), 3G and 4G broadband devices, and any other suitable wireless communication device. The communication component 30 is also configured to perform a messaging operation which is among the system operations discussed herein and includes at least one of creating, sending, receiving, and viewing messages via the mobile device. The communication component 30 is further configured to perform an Internet function which is among the system operations discussed herein and includes enabling the viewing of Internet content on, for example, a display 50 (e.g. a color display screen) as discussed below, or on a display on the mobile device.

The controller 22 further controls the storage component 36 to store information received via the communication device 32 for reasons discussed herein. The controller 22 further retrieves information stored in the storage component 36 for reasons discussed herein.

Figure 3:
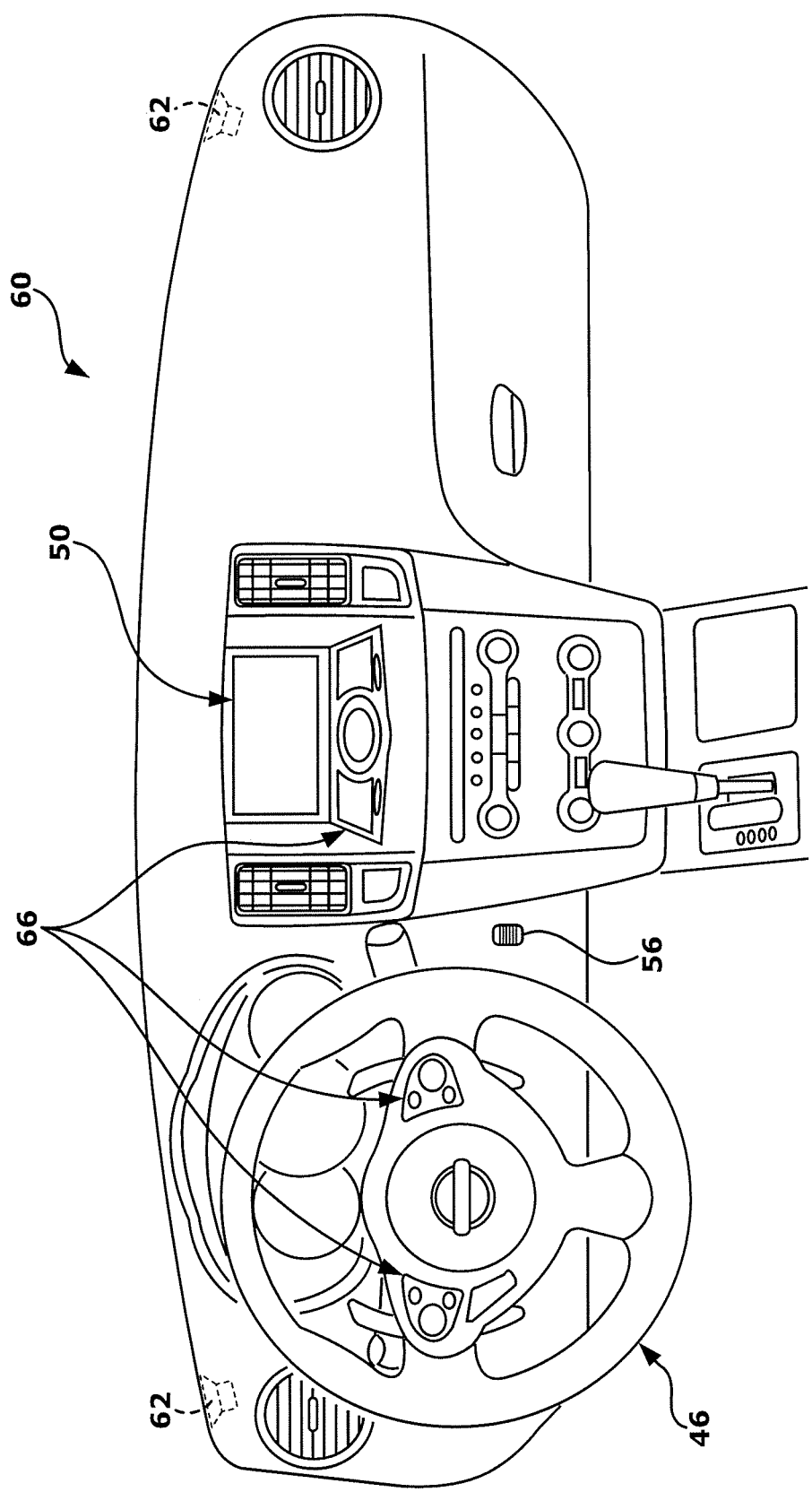
FIG. 3 is a perspective view of an example of an instrument panel in the passenger compartment of the vehicle that includes a display and controls of the HMI system.

As further shown in FIG. 2, the controller 22 communicates with other components of the vehicle 14, such as the steering system 38 and brake system 40 to control, for example, the power steering and power braking features of the vehicle 14 as understood in the art. In addition, the controller 22 receives signals from vehicle sensors 42 via, for example, a vehicle bus 44. The vehicle sensors 42 can include, for example, a vehicle speed sensor indicating the speed of the vehicle, a vehicle transmission sensor indicating the state in which the vehicle is operating, a steering sensor indicating the steering angle of the steering wheel 46, a braking sensor indicating the braking of the wheels 48, and occupant sensors indicating whether the person attempting to perform operations via the HMI system 16 is a driver or passenger. The controller 22 also communicates with user interface or communication components of the vehicle 14, such as a display 50, an audio system 52, manual input controls 54 and a microphone 56, to name a few. Some of these features can be present on the instrument panel 60 of the vehicle 14 as shown, for example, in FIG. 3.

That is, an instrument panel 60 typically includes at least one display 50 that can display information including navigation information such as maps, route information and the like, provided by a navigation component as known in the art. The display screen or screens 50 can also display vehicle condition information and messages, entertainment system information (e.g., radio channels), and communication information such as telephone calling information and so on. Speakers 62, which emit sound produced by the audio system

52, can be disposed in the instrument panel 60 and at various locations within the passenger compartment of the vehicle.

The manual input controls 54 can include a plurality of control buttons 66 that can be disposed, for example, on the steering wheel 46 and at other locations on the instrument panel 60. For example, control buttons 66 can be present below the display 50, and the display 50 can display control buttons that can be operated by a user as understood in the art. Also, the microphone 56 can be disposed in the instrument panel 60 or at any other suitable location within the passenger compartment of the vehicle, to receive voice input from a user. Accordingly, the speakers 62 emit sound, such as music from the entertainment system (audio system 52) of the vehicle, voice from hands-free telephone use, or messages pertaining to vehicle conditions, navigation and so on, to name a few. The microphone 56 receives, for example, voice commands for the HMI system 16 and voice input for hands-free telephone use. These components for inputting information can be referred to generally as making up an input device.

Accordingly, as will now be discussed, the telematics system 10 can be used to create an information set, such as an issue and solution database, which can be provided to vehicles so that vehicle users can access the information via, for example, their vehicle user interface and efficiently and effectively resolve an issue that may be occurring with their vehicle. In particular, the telematics system 10, which can generally be referred to as an information system, is configured to remotely create an information set including user accessible information pertaining to troubleshooting onboard components of the host vehicle 14, and to wirelessly communicate a portion of the information set to the host vehicle 14. The user interface system disposed at the host vehicle 14 is configured to receive the portion of the information set communicated by the information system and to selectively present the user accessible information in the portion of the information set for viewing at the host vehicle 14.

In addition, a user can access the information set stored on, for example, the server of the base station 18 by, for example, accessing an interactive voice response system (IVR) via the user's telephone, PDA or other device. Also, the user interface components of the host vehicle 14 can include a browser that enables a user to access the information set stored at the remote location (e.g., the base station 18) via the Internet. Furthermore, user accessible information can be uploaded and/or updated to the HMI system 16 via, for example, a flash drive, memory stick or other USB type device, a CD-ROM or any other suitable media, and stored in, for example, the storage component 36 for access by the user visually and/or audibly via the user interface components as discussed above. The updating can also be performed, for example, at the dealer when the vehicle is being serviced.

Figure 4:
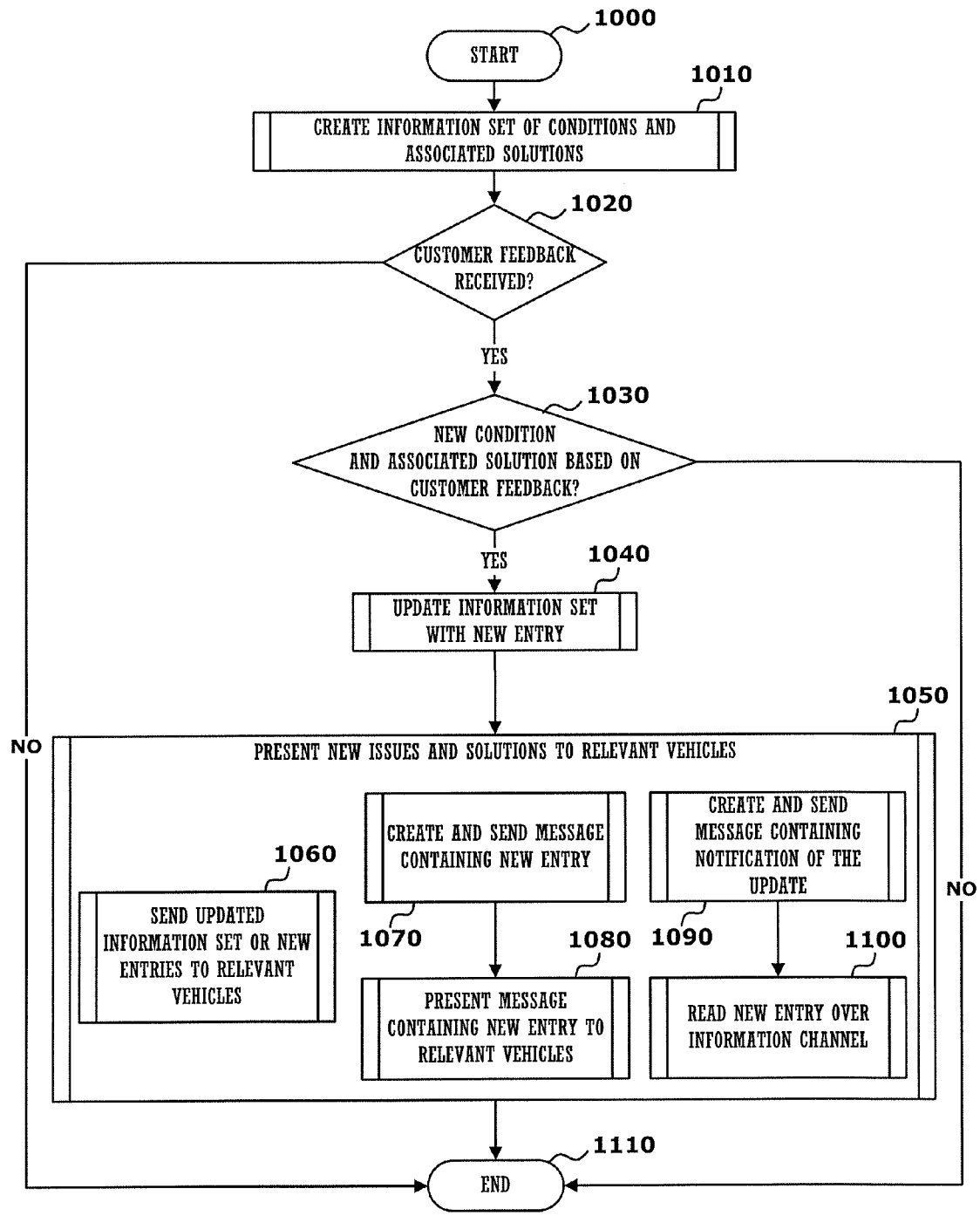
FIG. 4 is a flow chart illustrating an exemplary process for updating an information set including a description of vehicle conditions and associated solutions and providing the updated information set to the vehicle.

As shown in FIG. 4, the processing for creating an information set begins in step 1000. In step 1010, the telematics system 10 remotely creates an information set including user accessible information pertaining to troubleshooting onboard components of the host vehicle 14. The user accessible information pertaining to troubleshooting includes, for example, information pertaining to conditions of the onboard components of the host vehicle 14 and actions associated with the conditions. The conditions can include, for example, a maintenance period associated with one of the onboard components of the host vehicle 14, an indication of a malfunction of one or more onboard components, and an indication of an unexpected state of one or more onboard components. An unexpected state can be, for example, a loose fuel cap, and an unexpected drop in the level and/or pressure of a fluid, such as oil, brake fluid, power steering fluid, coolant, washer fluid, and so on. The conditions can also include an indication that an onboard component is subject to a recall, and an indication that the component has or has not yet been replaced according to the recall. The conditions could also include issues pertaining to peripheral devices, such as cellular telephones, PDAs, USB devices and so on, that can connect to the HMI system 16 via, for example, Bluetooth or a USB port. For example, different types of peripheral devices may have different issues when attempting to connect to the HMI system 16. Accordingly, the information set can include possible solutions for addressing these issues. The HMI system 16 can recognize the type of peripheral device attempting to connect to the HMI system 16, and a message addressing any issues associated with that peripheral device can be presented as discussed below (e.g., with regard to FIG. 19), or at any other suitable time.

The information set can, for example, be created at the server of a base station 18. Accordingly, the processing associated with creating and updating the information set, and sending the information set to the host vehicle 14 as discussed in more detail below, can be performed by the controller (server) at the base station 18. Furthermore, the controller (server) at the base station 18 can select an entry or entries of the user accessible information pertaining to troubleshooting onboard components of the host vehicle 14 as the portion of the information set that is wirelessly communicated to the host vehicle 14. Also, the wirelessly communicating can communicate an entirety of the information set as the portion to the host vehicle 14. Furthermore, the base station 18 can wirelessly communicate the user accessible information to a user via email, a short messaging service (SMS), text message and so on.

In step 1020, it is determined whether any customer feedback on vehicle issues has been received. That is, as issues arise for a particular type of vehicle, the users of that type of vehicle can arrive at solutions for addressing those issues. Accordingly, the users can provide information pertaining to those solutions to the telematics system 10 via, for example, email, website entries, surveys, and in any other suitable manner. For instance, if a user enters information on the vehicle manufacturer's customer assistance webpage, or sends an email including such information to the customer assistance email address, the telematics system 10 sends that information in any known manner to the locations at which the information set is being stored (e.g., the base stations 18). If it is determined in step 1020 that no customer feedback has been received, the processing ends in step 1110.

However, if customer feedback has been received, the processing continues to step 1030 where it is determined whether the customer feedback is associated with a new condition and a new associated solution and/or a new solution for an existing condition. If the information is not associated with a new condition and/or new solution, the processing ends in step 1110. On the contrary, if the customer feedback is associated with a new condition and/or new solution, the processing continues to step 1040 where the information set is updated. That is, information pertaining to the new issues and solutions are entered in the information set database. During this updating, issues that have been resolved and are generally not occurring anymore in a vehicle, or solutions to such issues that have become commonly known, can be phased out and thus removed from the database. Hence, the base station 18, for example, remotely updates at least a portion of the user accessible information to create updated user accessible information, and the remotely updating includes changing the at least a portion of the user accessible information based on information received from users of other vehicles.

The processing then continues to step 1050 where the new issues and solutions are provided to the relevant vehicles. That is, in step 1060, the telematics system 10 sends information pertaining to the issues and/or solutions relating to a particular model vehicle to vehicles of that model that are useable with the telematics system 10 as the portion of the information set. To send the information set, a base station 18, for example, can wirelessly communicate a portion of the information set to the host vehicle 14. Hence, the base station 18, for example, wirelessly communicates the updated user accessible information to the host vehicle 14. The controller 22 then updates the information set stored in, for example, the storage component 36 of the host vehicle 14 based on the updated user accessible information.

Alternatively, or in addition, the base station 18 can create and send a message containing the new information to the host vehicle 14 in step 1070. Upon receipt of the message, the vehicle's HMI system 16 can present a message in step 1080. Hence, the HMI system 16 operates the user interface components (e.g., the display 50, audio system 52, manual input controls 54 and microphone 56) to selectively make available the user accessible information in the portion of the information set for access at the host vehicle 14.

Figure 5:
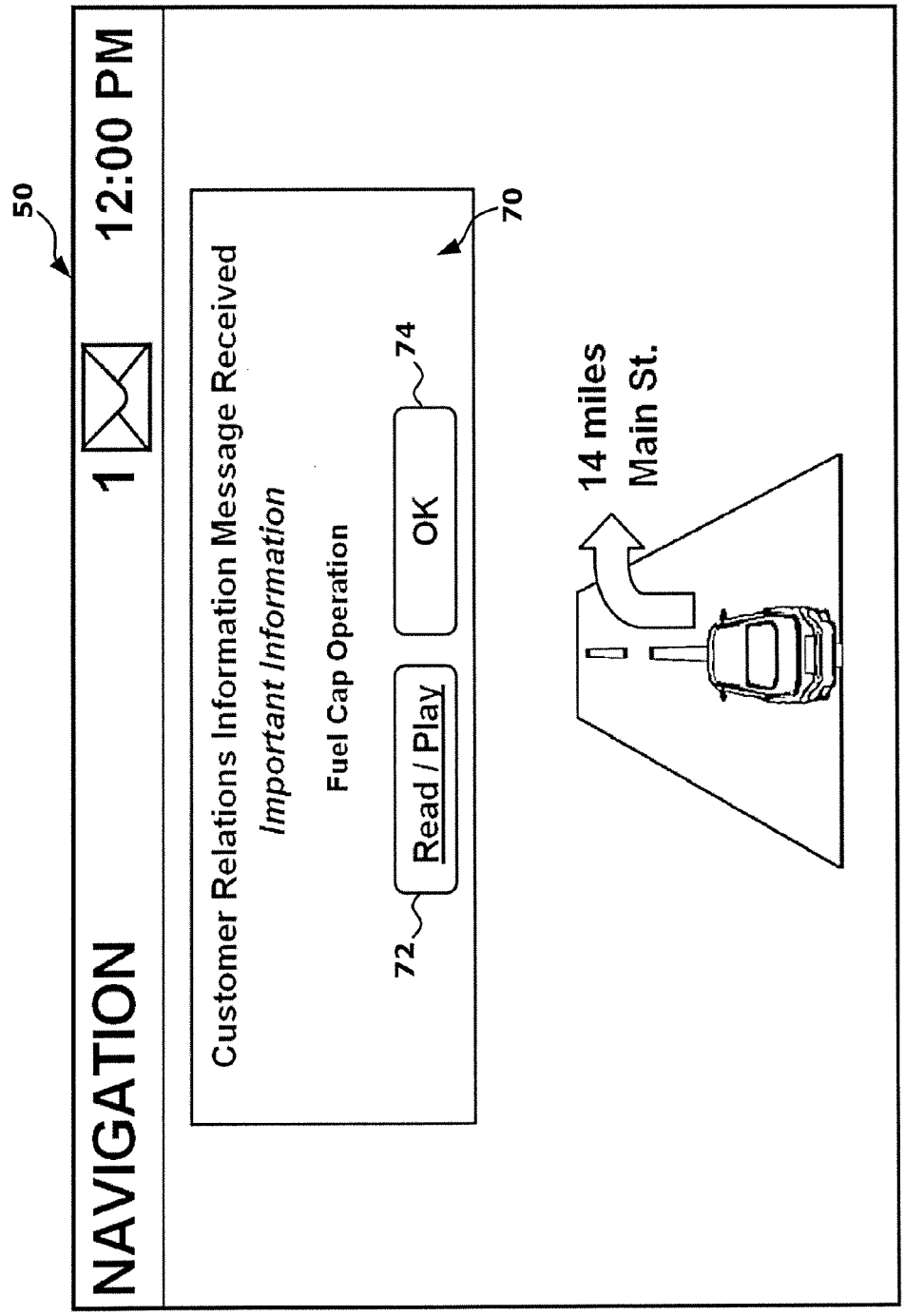
FIG. 5 is an exemplary pictorial representation of a display screen with a pop-up message notification.

For example, as shown in FIG. 5, the controller 22 can control the vehicle display 50 to display a message 70 indicating that the host vehicle 14 has received a customer relations information message. The user can then access the message 70 as discussed in more detail below. For example, the message 70 can include a read/play button 72 that the user can select to instruct the controller 22 to control the audio system 52 to audibly read the text of the message 70. In addition, the message 70 can include an acknowledgement button 74 (an "ok" or "accept" button) that the user can select to acknowledge the warning. When the acknowledgement button 74 has been selected, the controller 22 can control the display 50 to stop displaying the message 70.

Figure 18:
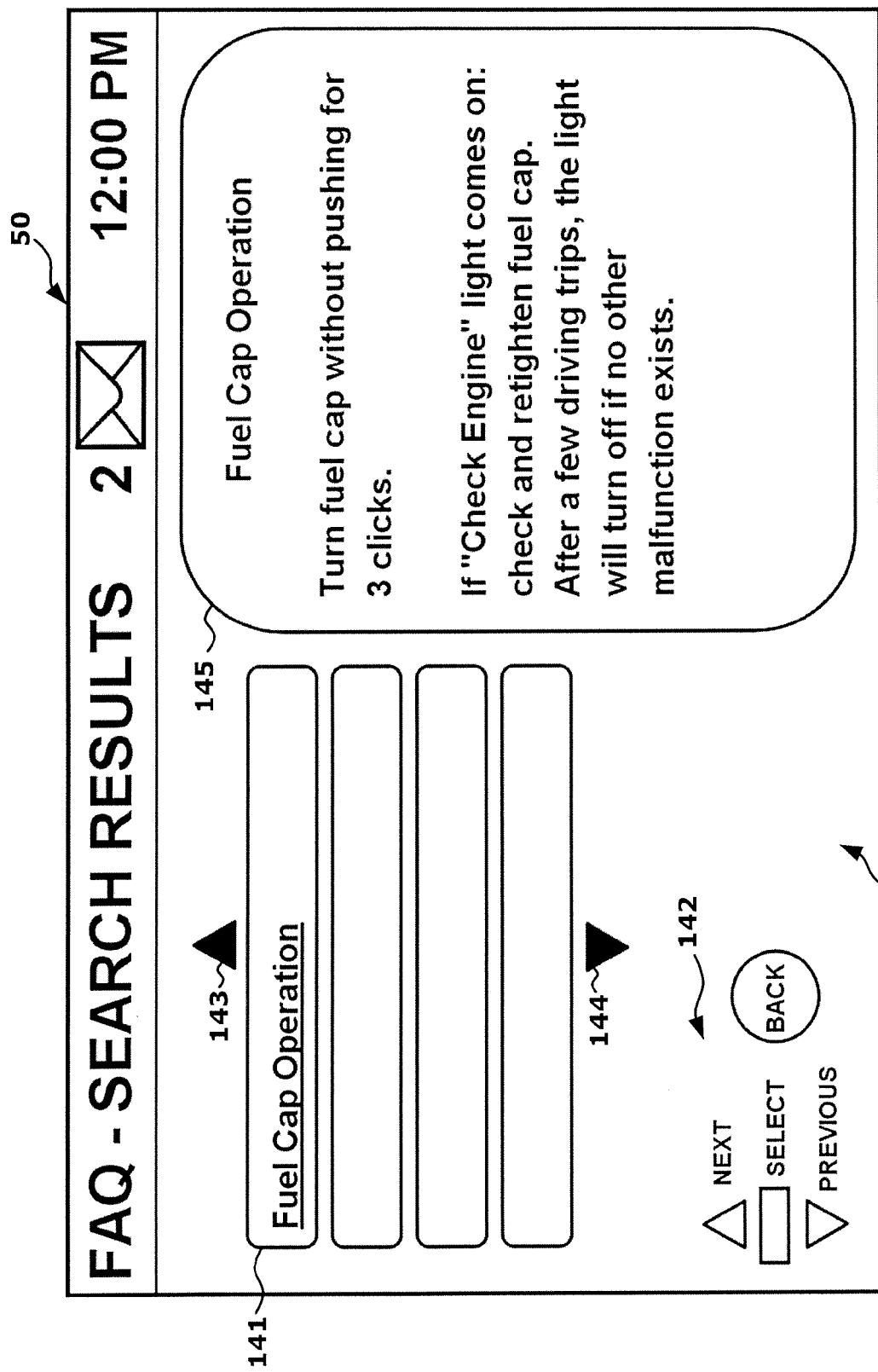
FIG. 18 is an exemplary pictorial representation of a search results screen for presenting FAQ search results based on entered search criteria.

Alternatively, in step 1090, the base station 18 can send a message to the host vehicle 14 indicating that certain information in the information set pertaining to the host vehicle 14 has been updated. The display 50 can display this type of message in a manner similar to message 70 in FIG. 5 as discussed above. The user can then choose to read the updated information over, for example, an information channel in step 1100. For instance, the user can read the entries over a Telematics Information Channel, similar to the manner in which traffic and weather reports are presented to a vehicle user. The HMI system 16 could also allow the user to "tune in" to a channel with the issues and solutions being read aloud. Also, the HMI system 16 could present the updated information using a combination of the display and Telematics Information Channel features. For example, the user could tune to the information channel to have the portion of the information set read aloud, while the text of the entry, or some graphic, is displayed on the display 50. The text could be displayed as, for example, a message 145 as shown in FIG. 18, or the text could be limited to a character-limited scrolling bar (e.g. 25 characters).

It should also be noted that the information can include details for resolving an issue, or can simply refer to the appropriate section and/or page of an electronic owners' manual or printed owners' manual. For example, the message containing the information can include a specific reference to the appropriate section and/or page of the electronic owner's manual or printed owners manual, or in the case of message 70 as discussed above, the message can include a selectable link to access the appropriate section and/or page of the electronic owner's manual.

Upon completing the operations in step 1050, including one or more of steps 1060 through 1100 as discussed above, the processing ends at step 1110. When the processing is repeated, the base station 18, for example, can remotely create a second information set including user accessible information pertaining to troubleshooting onboard components of the host vehicle 14, and wirelessly communicate a portion of the second information set to the host vehicle 14. The controller 22 can thus replace the portion of the information set stored in, for example, the storage component 36 of the host vehicle 14 with the portion of the second information set wirelessly communicated to the host vehicle 14. The processing can continue to be repeated, and thus, the base station 18 (or other off-vehicle site) can create multiple information sets, and these multiple information sets can be organized into various levels of information sets. For example, certain information sets can be organized into an OEM level that applies to all vehicles made by a particular manufacturer, a vehicle level that is model specific or even trim-level specific, and a component or system level that applies to specific onboard components and/or systems. Naturally, the information sets can be organized in any suitable manner.

Thus, as can be appreciated from the above, the telematics system 10 (the information system) is further configured to remotely update at least a portion of the user accessible information to create updated user accessible information and to wirelessly communicate the updated user accessible information to the host vehicle 14. The user interface system on the host vehicle 14 is further configured to update the information set at the host vehicle 14 based on the updated user accessible information. However, the processes shown in steps 1040 through 1100 can be performed whenever the information set is updated, regardless of whether the updates are due to customer feedback or are simply manufacturer updates.

Figure 6:
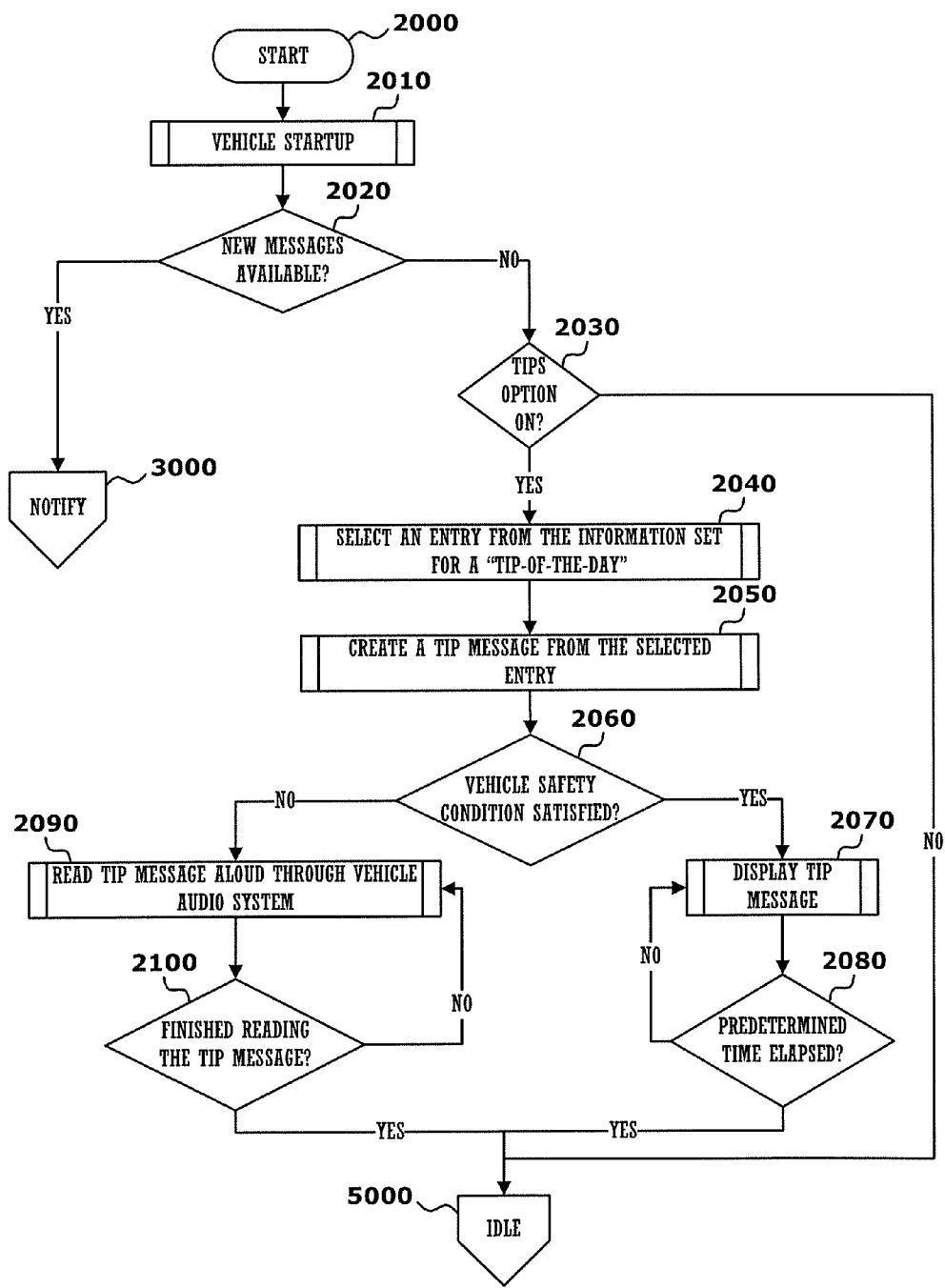
FIG. 6 is a flow chart illustrating an exemplary process for presenting new messages upon startup of the vehicle.
Figure 7:
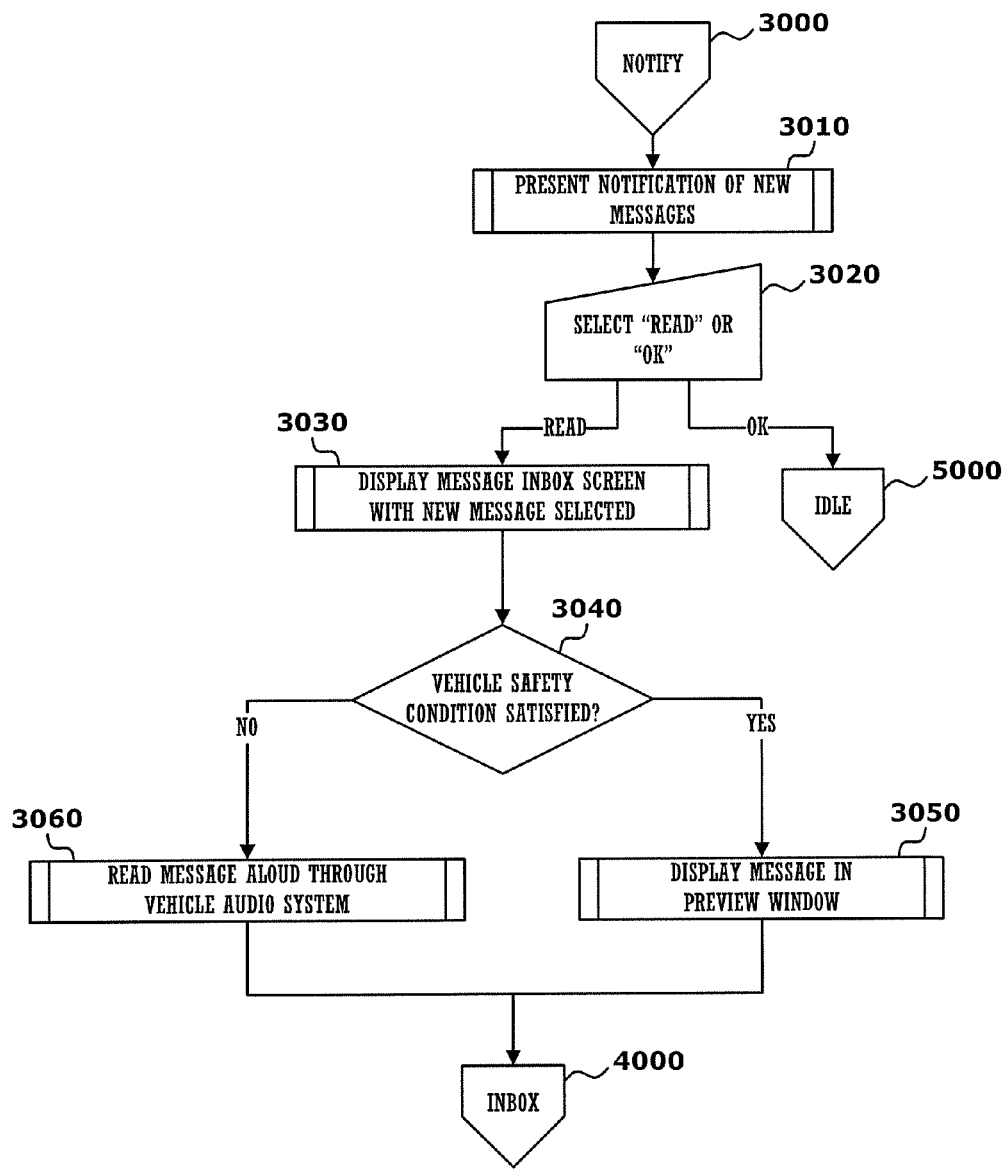
FIG. 7 is a flow chart illustrating an exemplary process for presenting a notification of new messages.

FIG. 6 is a flow chart illustrating an exemplary process for accessing entries from the information set at the vehicle 14 when the vehicle is started. The process begins in step 2000, when the ignition is activated and the vehicle 14 is started in step 2010. The processing can be performed by, for example, the controller 22 and associated components. The processing determines in step 2020 whether any new messages are available from the telematics system 10, indicating that the information set has been updated. If any new message is available, the processing continues to step 3000, and continues with the notification process as shown in FIG. 7.

When the exemplary notification process begins in step 3000, the controller 22 can control the user interface components (e.g., the display 50, audio system 52, manual input controls 54 and microphone 56) to present a notification of the new message in step 3010. For example, the controller 22 controls the display 50 to display a message 70 as shown in FIG. 5 and discussed above. Alternately or in addition, the controller 22 controls the audio system 52 to present an audible notification of the new message. Hence, the controller 22 operates the user interface to provide notification of receipt of the portion of the information set at the host vehicle 14, and the notification includes operating the user interface to visually display a notification and/or operating the user interface to emit an audible alert.

In step 3020, the user can decide whether to read the message by selecting the read/play button 72, or ignore the message by selecting the acknowledgment ("ok") button 74. Thus, messages pertaining to non-urgent issues can be stored and viewed at a time of the user's choosing. These messages can be created, presented, and stored at regular intervals or, for example, when update to the database stored on the storage component 36 occurs, when the vehicle is being started, when a sensed vehicle condition corresponds to an issue in the database as discussed with regard to FIG. 19 below, or at any other suitable time.

Furthermore, the HMI system 16 can classify issues according to varying degrees of urgency, and handle these issues differently. For example, the controller 22 can control the user interface components to present a notification for issues having a certain level of urgency. However, for issues having a lower level of urgency, the controller 22 may not control the user interface components to present a notification. Rather, for less urgent or non-urgent issues, the controller 22 simply may send a message to the inbox for reading by the user at any convenient time. Also, the messages can be presented in a list or hierarchical manner based on levels of urgency, with the messages pertaining to the most urgent issues being presented first or at the top of the list, and the messages pertaining to the less urgent issues appearing later or lower in the list. Naturally, the levels of urgency and the manner in which issues at these varying levels of urgency are handled can be set as desired.

In addition, the initial notification of an issue can be a general type of warning, such as turning on the "check engine light" and/or issuing an audible check engine warning. Upon receiving the warning, the user can control the user interface components to be presented with a more detailed message as discussed herein.

Figure 8:
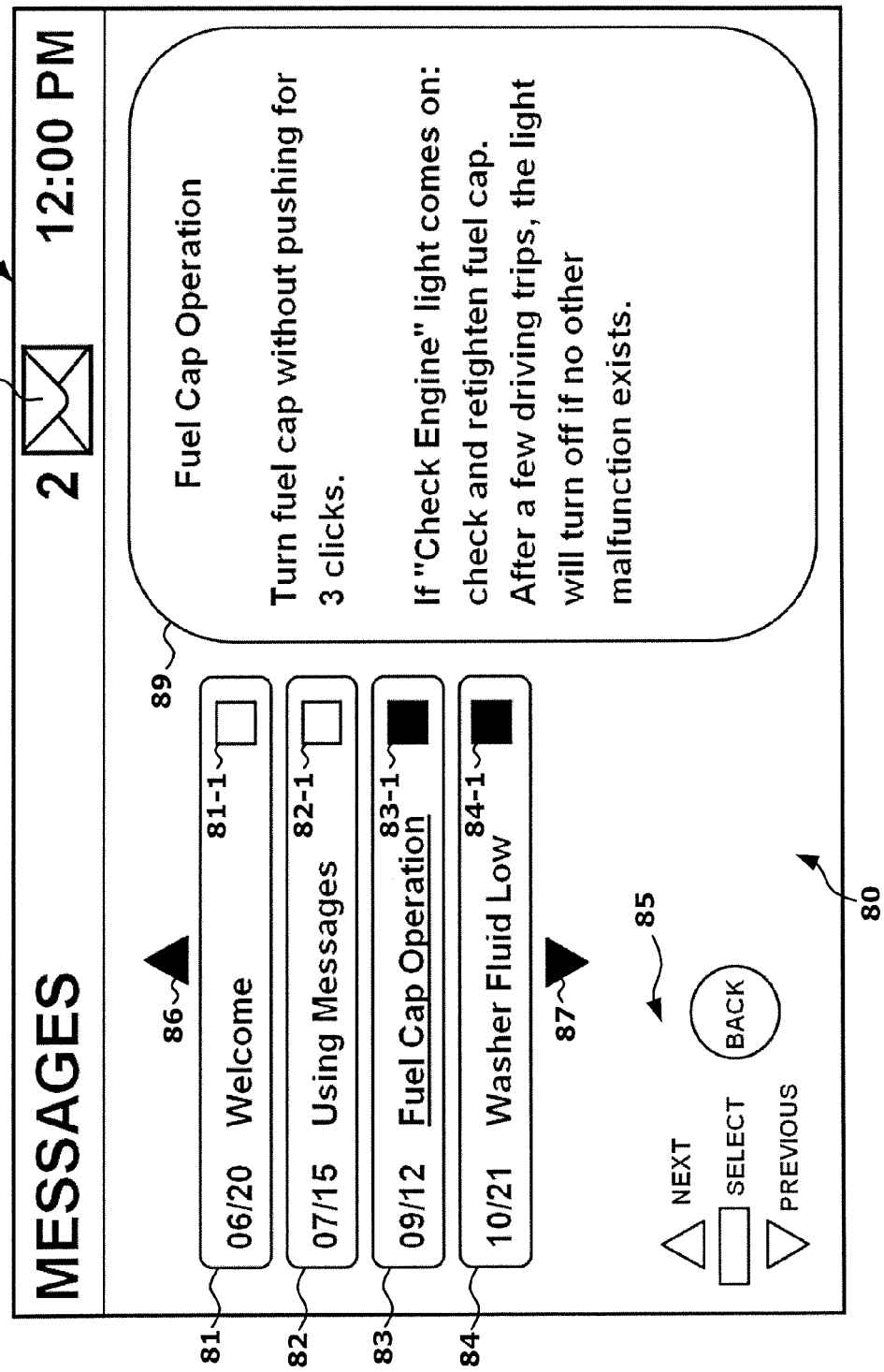
FIG. 8 is an exemplary pictorial representation of a message inbox screen for presenting messages and viewing the text of a selected message.

If the user selects the read/play button 72, the processing continues to step 3030 where the controller 22 controls the display 50, for example, to display a messages menu screen 80 as shown in FIG. 8 with the new message automatically selected. That is, the messages menu screen 80 includes buttons 81-84, for example, that enable a user to select a particular message category, such as a welcome message 81, a using messages instruction message 82, a fuel cap operation message 83, or a washer fluid low message 84, to name a few. The dates on which the messages were received or updated are displayed in the respective buttons (e.g., 06/20 for the welcome button 81). The user can use the manual input controls 54, including voice activated controls as discussed above, and/or displayed controls 85, as well as up arrow 86 and down arrow 87, to navigate the messages menu screen 80, to display additional buttons on the messages menu screen 80, and to select a button. It should also be noted that the messages menu screen 80 includes an indicator 88, such as an envelope icon, to indicate the number of new messages that are available (e.g., two in this example). The buttons also include indicators 81-1, 82-1, 83-1 and 84-1 which indicate whether a new message is present under the category identified by the button. In this example, a new message is present for the fuel cap operation category 83 and the washer fluid low category 84. Accordingly, indicators 83-1 and 84-1 are highlighted.

In this example, the fuel cap operation button 83 having a new message has been automatically selected in step 3030, as indicated by the underline under the phrase "fuel cap operation." The processing then determines in step 3040 whether vehicle safety conditions have been satisfied. For example, the controller 22 can determine, based on information received from the vehicle sensors 42, whether the vehicle 14 is traveling below a threshold value (e.g., 5 mph) as the safety condition, or whether someone other than the driver is trying to access the message. If the safety condition has been met, for example, the vehicle is traveling below the threshold and/or the user trying to access the message is a passenger, the processing continues to step 3050. In step 3050, the controller 22 controls the display 50 to display a message 89 for solving an issue associated with an improperly tightened fuel cap as shown in FIG. 8. Also, as mentioned above, the information in the message 89 can include details for resolving the issue, or can simply refer or link to the appropriate section and/or page of an electronic owners' manual or printed owners' manual.

However, when the vehicle safety condition has not been met (e.g., the vehicle is not traveling below the threshold and the driver is attempting to access the messages), the processing continues to step 3060 where the controller 22 and associated components translate the message from text to speech and control the audio system 52 to audibly present the message. In this event, the controller 22 controls the display 50 to display the messages menu screen 80 with the audio indication 89-1 instead of the text of the message. Thus, the notification includes operating the user interface to audibly read the portion of the information set received at the host vehicle 14. Naturally, when the safety condition has been met, the message 89 can be presented in step 3050 visually and audibly.

Figure 10:
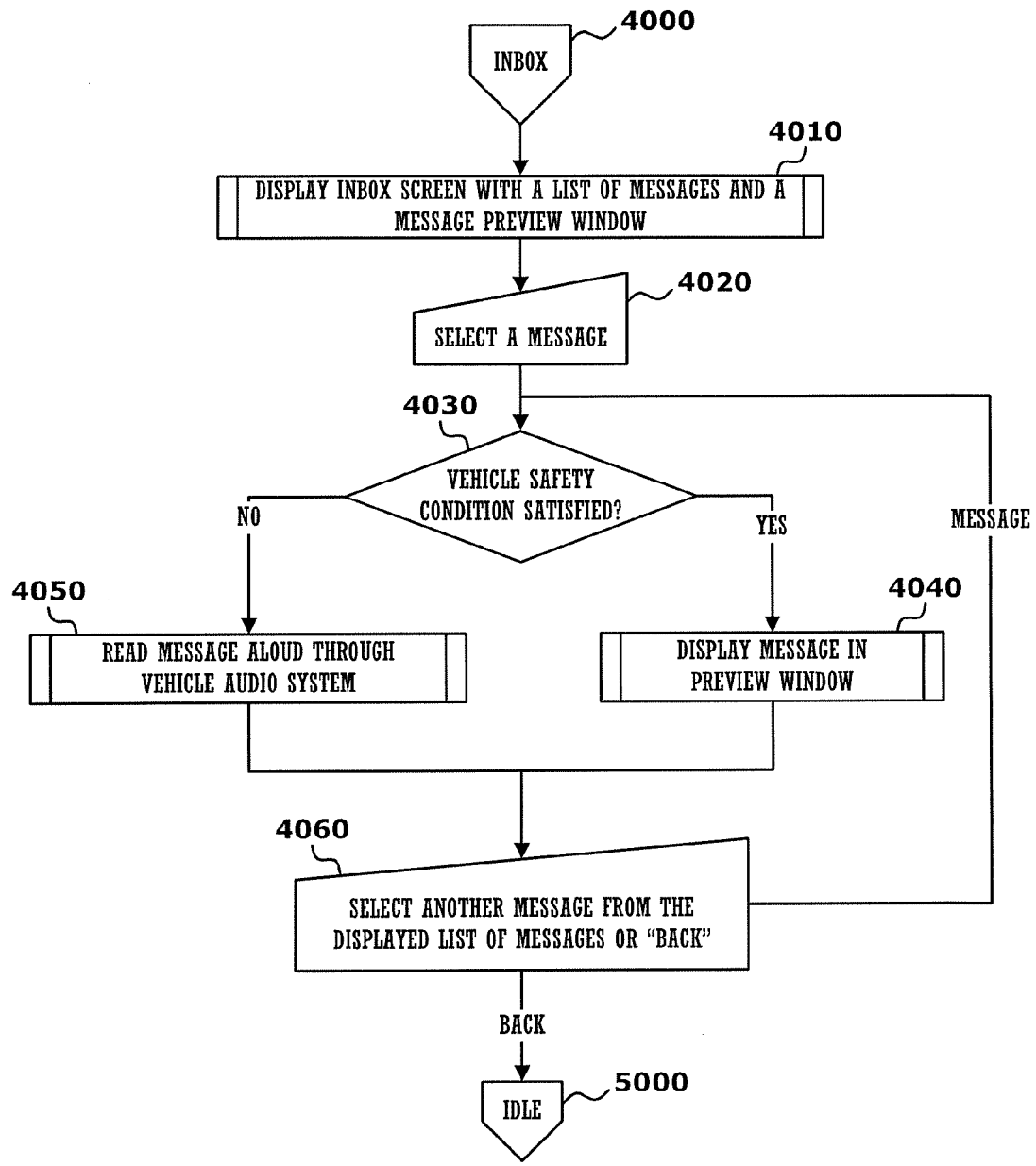
FIG. 10 is a flow chart illustrating an exemplary process for presenting an inbox with a message list for presenting the messages.

After steps 3050 or 3060 have been performed, as appropriate, the processing continues to the inbox operations beginning in step 4000 as shown in FIG. 10. In step 4010, the controller 22 controls the display 50, for example, to display a messages menu screen 80 as shown in FIG. 8 and discussed above. The user can use the manual input controls 54, including voice activated controls, and/or displayed controls 85, as well as up arrow 86 and down arrow 87, to navigate the messages menu screen 80, to display additional buttons on the messages menu screen 80, and to select a button associated with a message in step 4020.

The processing then determines in step 4030 whether vehicle safety conditions have been satisfied as discussed above with regard to step 3040. If the safety condition has been met, the processing continues to step 4040 where the controller 22 controls the display 50 to display a message for solving an issue in a manner similar to that shown in FIG. 8 and discussed above. However, when the vehicle safety condition has not been met, the processing continues to step 4050 where the controller 22 and associated components translate the message from text to speech and control the audio system 52 to audibly present the message. In this event, the controller 22 controls the display 50 to display the messages menu screen 80 with the audio indication 89-1 as discussed above. Naturally, when the safety condition has been met, message can be presented in step 4040 visually and audibly.

Figure 11:
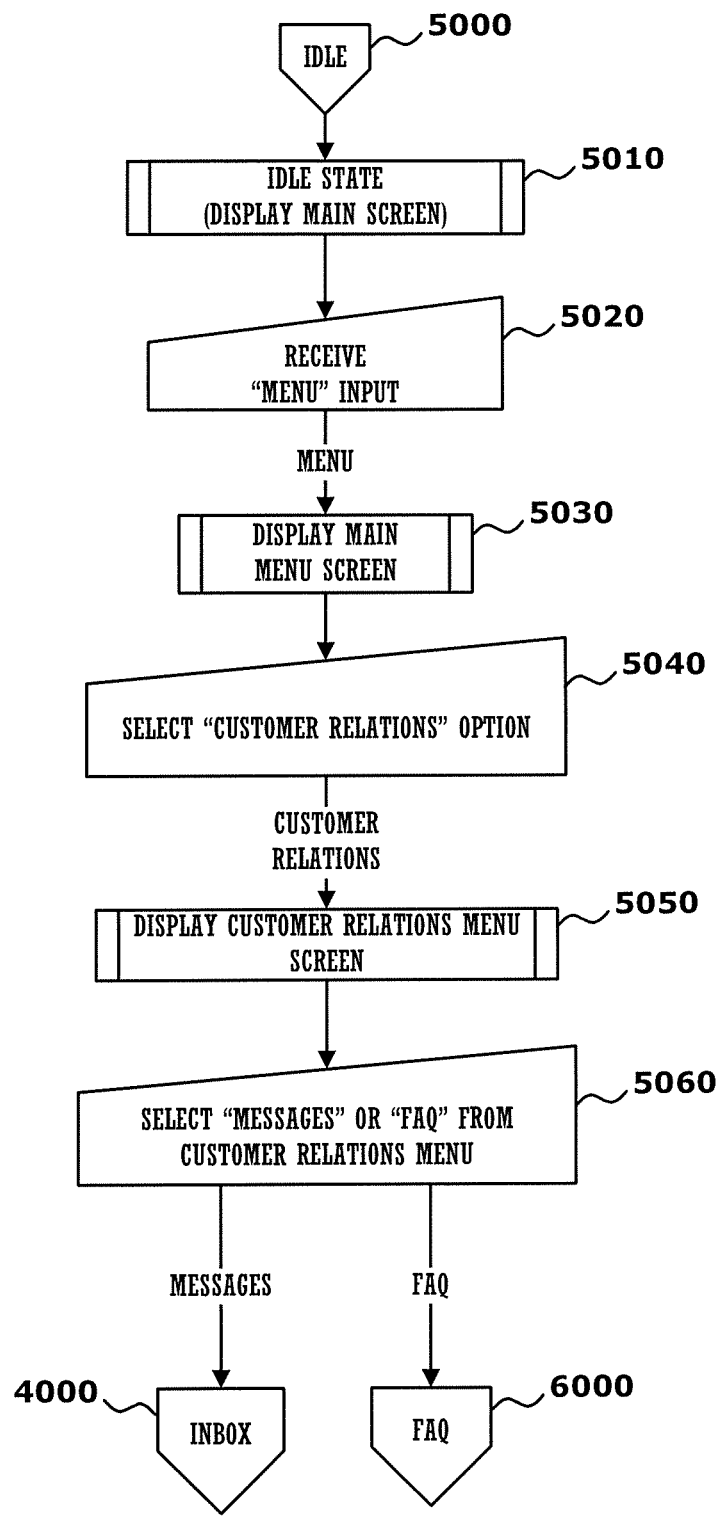
FIG. 11 is a flow chart illustrating an exemplary process for access entries from the information set using a menu.

If the user selects another message in step 4060, the processing returns to step 4030 and repeats as discussed above for the newly selected message. However, if the user selects the "back" button, the processing continues to the idle processing beginning in step 5000 as shown in FIG. 11. Also, with regard to the processing shown in FIG. 7, if the user selects to ignore the message in step 3020 by selecting the acknowledgement button 74, the processing continues to the idle processing beginning in step 5000 which is discussed in more detail below.

Before discussing the idle processing, it should be noted that if it is determined in step 2020 of FIG. 6 that a new message is not available, instead of continuing with the notification processing 3000 discussed above with regard to FIG. 7, the processing continues from step 2020 to step 2030. In step 2030, the controller 22 determines whether the user tips option is on. If the user tips option is on, the processing continues to step 2040, where to controller 22 can, for example, select an entry from the information set to be presented as a "tip-of-the-day." In step 2050, the controller 22 can create a "tip" message including the selected entry to be presented to the user as the "tip-of-the-day." Hence, the controller 22 can control the user interface to present a "tip-of-the-day" at vehicle startup To present the "tip-of-the-day" message to the user, the processing determines in step 2060 whether vehicle safety conditions have been satisfied as discussed above with regard to step 3040. If the safety conditions have been met, the processing continues to step 2070 where the controller 22 controls the display 50 to display the tip message for solving an issue. Preferably, the controller 22 can control the display 50 to display the tip message for a predetermined amount of time in step 2080. Alternatively, the tip message can be presented to the user in a manner similar to that shown in FIG. 8 and discussed above, along with the read/play button 72 for repeating the text of the tip message aloud over audio system 22 or displaying the text of the tip message on display 50, and an acknowledgement button 74 to acknowledge the tip message and clear the display 50. However, when the vehicle safety conditions have not been met, the processing continues to step 2090 where the controller 22 and associated components translate the tip message from text to speech and control the audio system 52 to audibly present the message. In this event, the controller 22 can control the display 50 to display an audio indication, such as audio indication 89-1 as discussed above. In step 2100, the controller 22 can determine whether the audio system 52 is finished presenting the text of the tip message before continuing the processing. Naturally, when the safety conditions have been met, the tip message can be presented in step 2070 visually and audibly. After steps 2070 and 2080 or 2090 and 2100 have been completed as appropriate, the processing continues to the idle state processing 5000 as shown in FIG. 11 and as now will be described.

Figure 12:
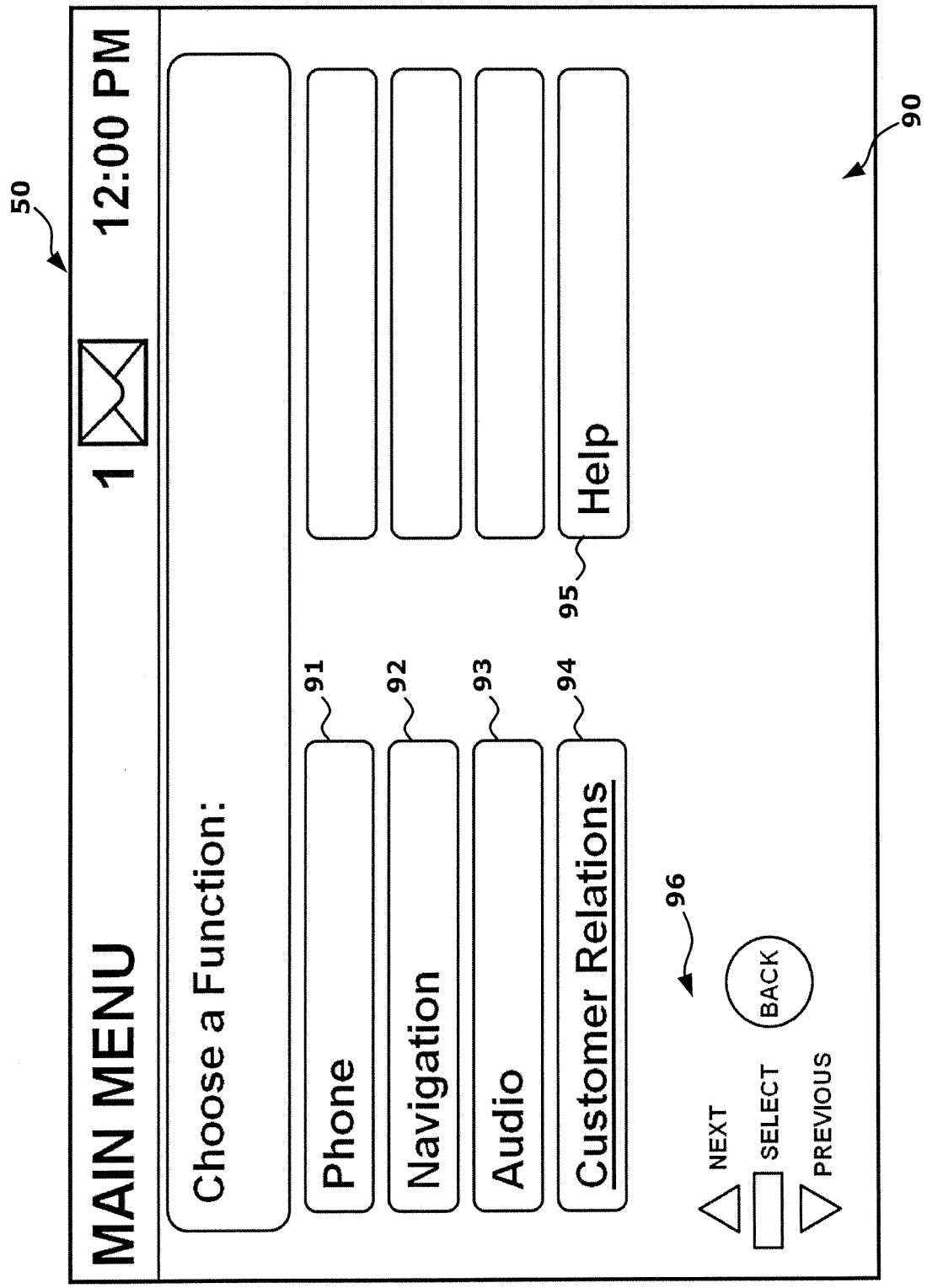
FIG. 12 is an exemplary pictorial representation of a main menu screen.

When the idle processing begins in step 5000, the user interface components (e.g., the display 50, audio system 52, manual input controls 54 and microphone 56) enter an "idle" state in step 5010. For example, the display 50 could be displaying a navigation map, radio channels, and other information as understood in the art. Otherwise, if no other information is available or required, the controller can clear the display 50 to be blank when entering the idle state. When a user inputs a "menu" command via the user interface components (e.g., the manual input controls 54 or the microphone 56) in step 5020, the controller 22 controls, for example, the display 50 in step 5030 to display a main menu screen 90 as shown in FIG. 12. The main menu screen 90 includes buttons 91-95, for example, that enable a user to select a particular function to control or configure (e.g., telephony, navigation, audio, etc.), or can select a sub-menu such as a "customer relations" menu, or receive help for using the main menu by selecting the "help" button 95. The user can use the manual input controls 54, including voice activated controls, and/or displayed controls 96 to navigate the main menu screen 90 and to select a button. The controller 22 also can alternatively, or in addition, control the audio system 52 to audibly present the available functions and enable a user to select an available function verbally via, for example, the microphone 56.

Figure 13:
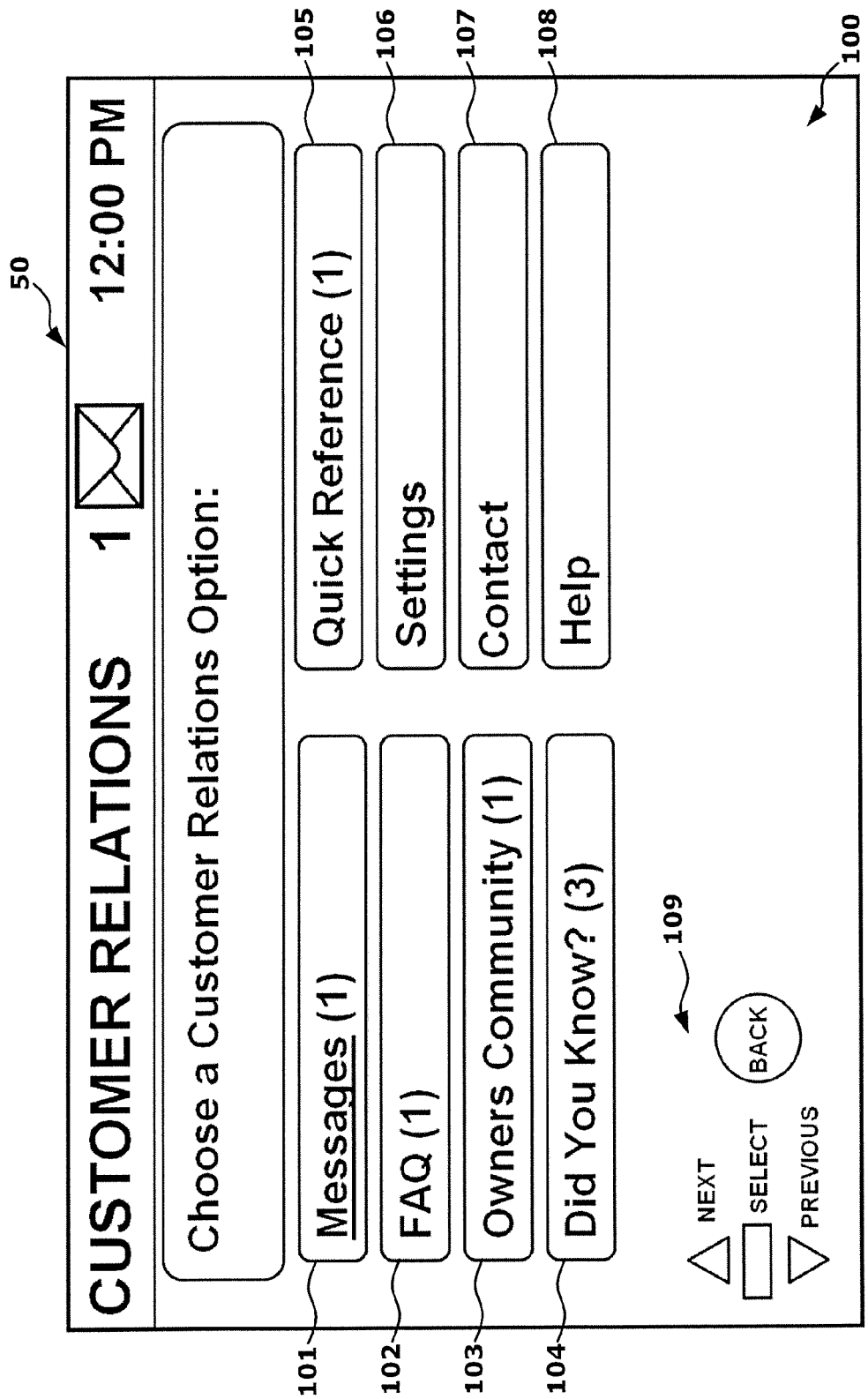
FIG. 13 is an exemplary pictorial representation of a customer relations menu screen.

In this example, the user selects the "customer relations" button 94 in step 5040. Upon doing so, the controller 22 controls, for example, the display 50 in step 5050 to display a customer relations menu screen 100 as shown in FIG. 13. The customer relations menu screen 100 includes buttons 101-108, for example, that enable a user to select a particular customer relations option as shown. The user can use the manual input controls 54 and/or displayed controls 109 to navigate the customer relations menu screen 100 and to select a button. The controller 22 also can alternatively, or in addition, control the audio system 52 to audibly present the available functions and enable a user to select an available function verbally via, for example, the microphone 56.

Figure 14:
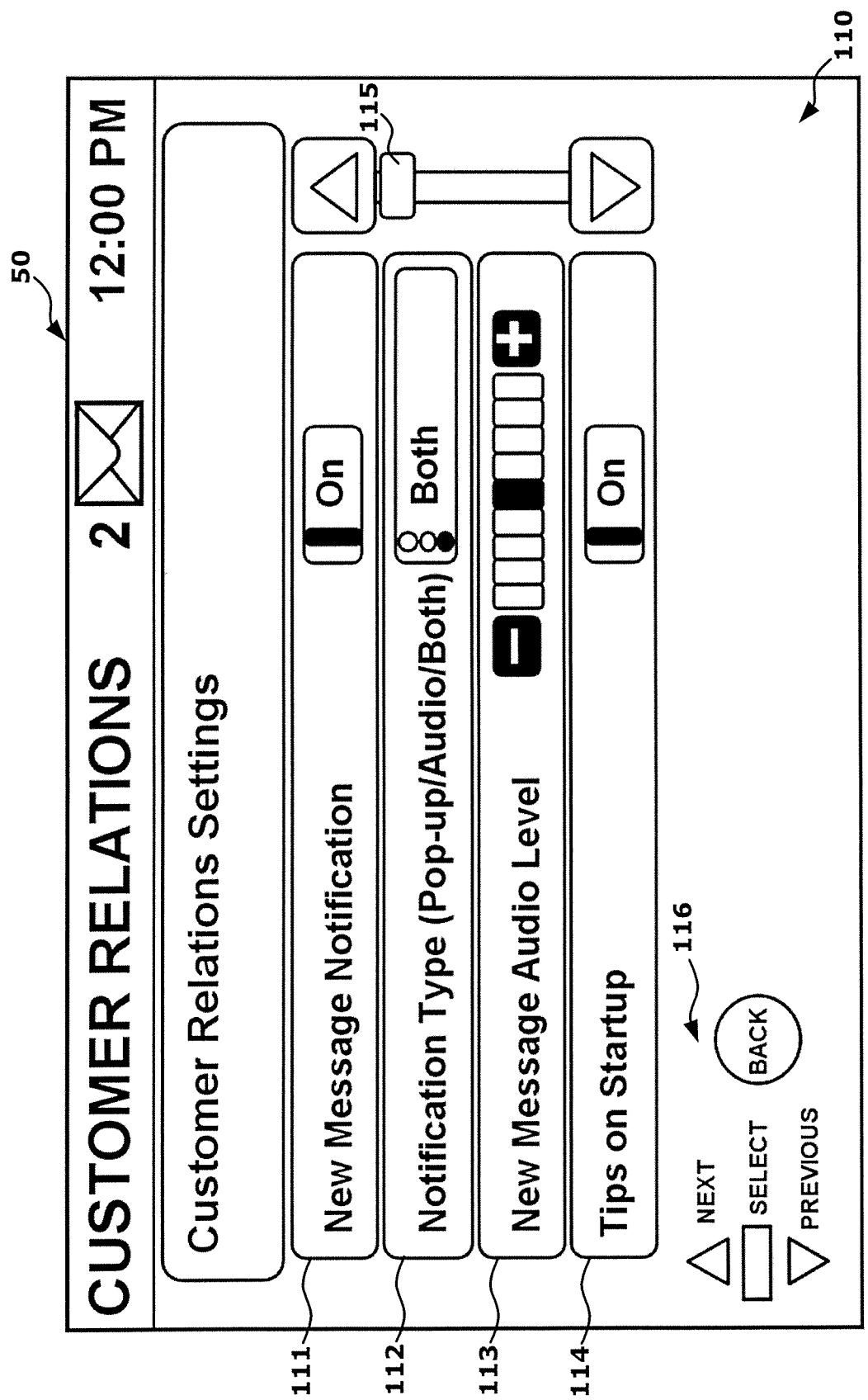
FIG. 14 is an exemplary pictorial representation of a customer relations setting screen for selecting settings for the telematics information system.

For instance, the user can select the settings button 106 to change the desired settings for the HMI system 16. When the settings button 106 is selected, the controller 22 can control the display 50 to display a customer relations setting screen 110 as shown in FIG. 14. As indicated, the customer relations setting screen 110 includes buttons 111 through 114 that enable a user to select and alter different features of the MHI system 16. The user can also access additional buttons using the scroll bar 115, the displayed controls 116 and any of the manual input controls 54 as discussed above.

Figure 15:
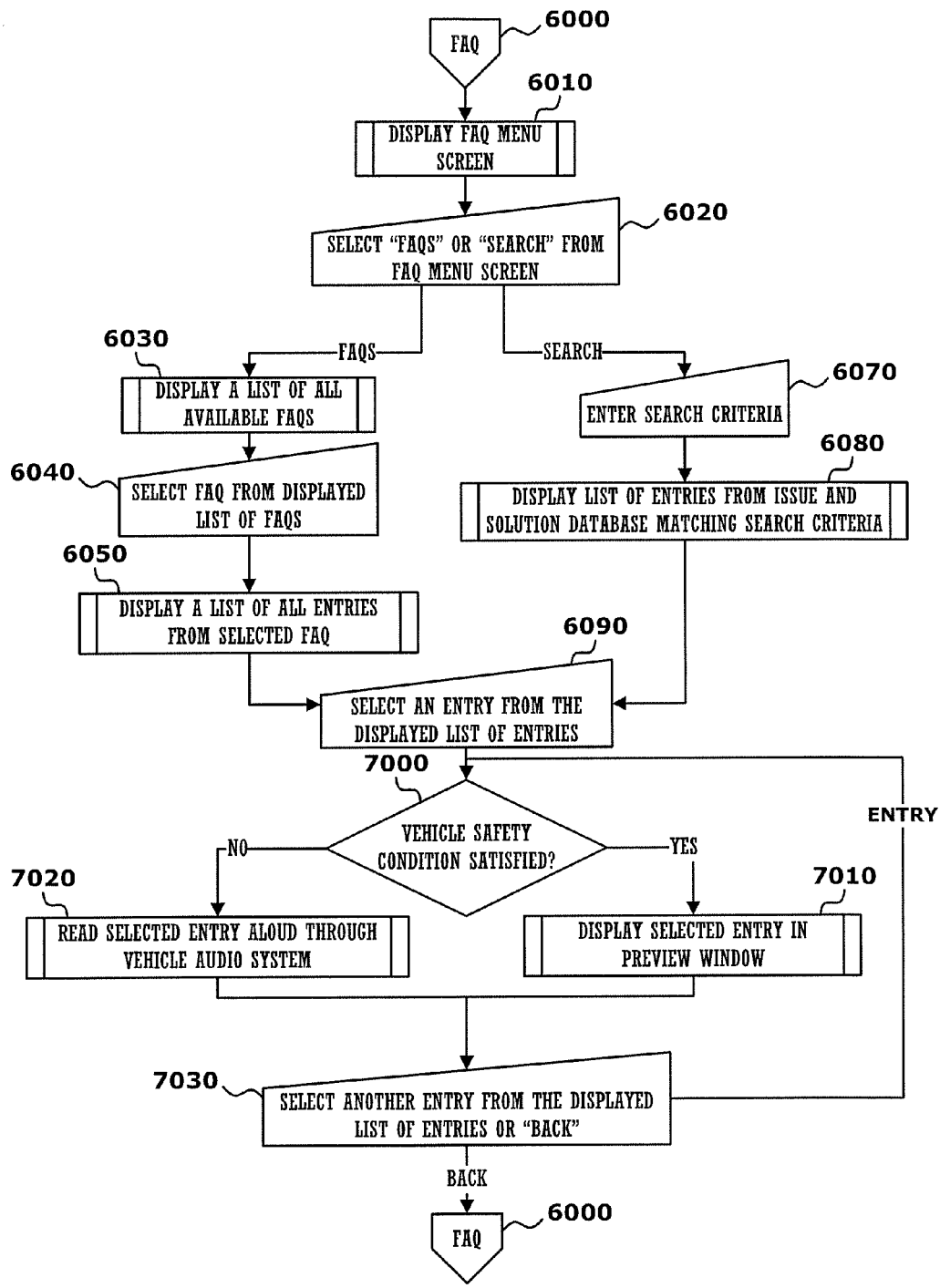
FIG. 15 is a flow chart illustrating an exemplary process for displaying and searching entries in an available frequently asked questions (FAQs) section of the information set.

In the example shown in FIG. 11, the processing will determine in step 5060 whether the user selects the "messages" button 101 or the "FAQ" button 102. If the user selects the "messages" button 101, the processing continues to step 4000 to handle the inbox processing as shown, for example, in the flowchart of FIG. 10 and discussed above. However, if the user selects the "FAQ" button 102, the processing continues to the FAQ processing beginning in step 6000 as shown in FIG. 15.

Figure 16:
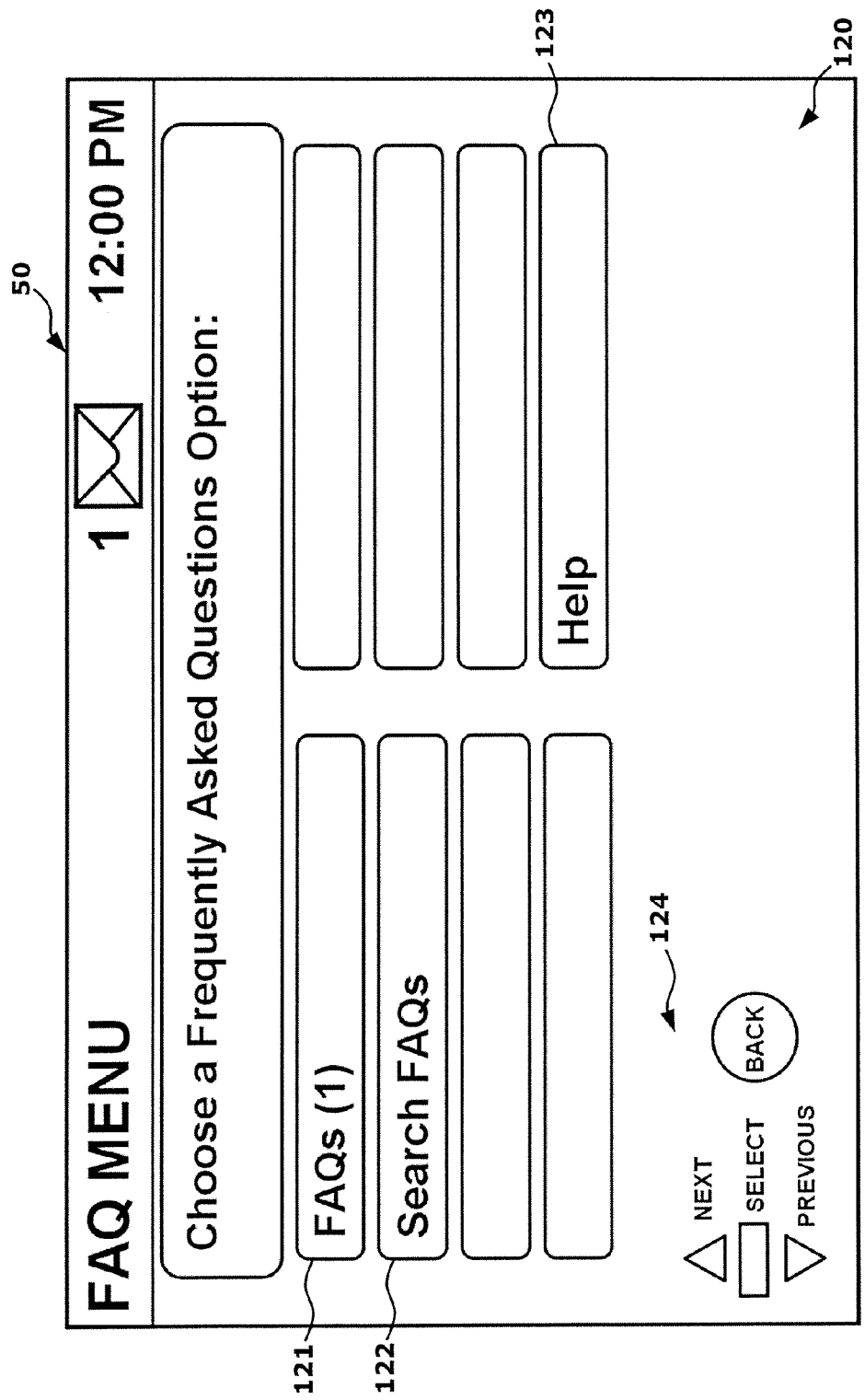
FIG. 16 is an exemplary pictorial representation of an FAQ menu screen.

When the FAQ processing begins in step 6000, the controller 22 controls the display 50 in step 6010 to display an FAQ menu screen 120 as shown, for example, in FIG. 16. The FAQ menu screen 120 includes buttons such as a FAQs button 121, a Search FAQs button 122, and a Help button 123. The user can use the manual input controls 54, including voice activated controls as discussed above, and/or displayed controls 124 to navigate the FAQ menu screen 120 and to select a button.

For example, if the user selects the FAQs button 121 in step 6020, the processing continues to step 6030 when the controller 22 controls the display 50 to display a list of all or a portion of all available FAQs. The user can then select an FAQ from the displayed FAQs in step 6040, in which event the controller 22 controls the display 50 in step 6050 to display a list of all or a portion of all entries (e.g., questions and answers) associated with the selected FAQ.

Figure 17:
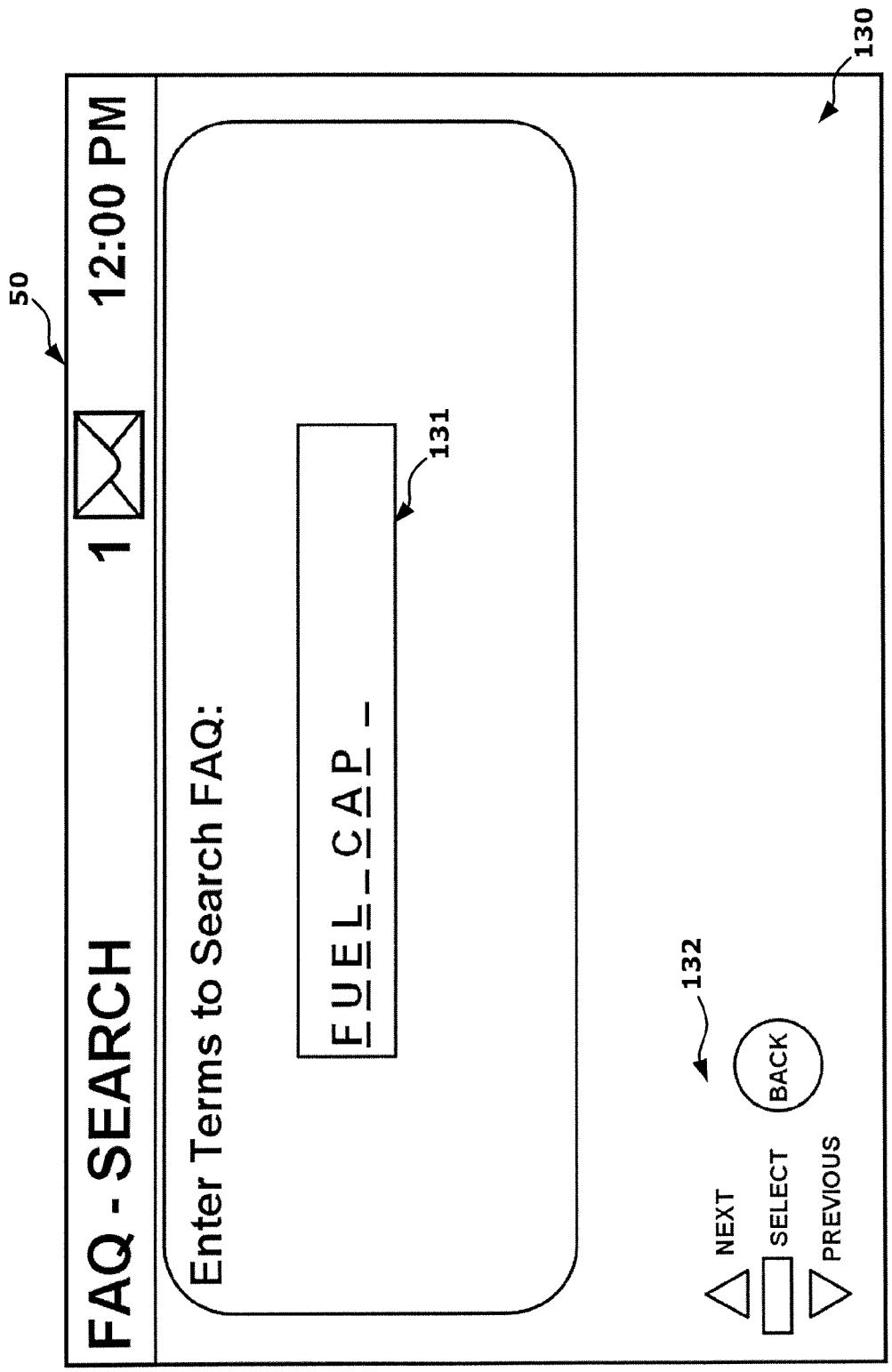
FIG. 17 is an exemplary pictorial representation of a search screen showing the input section for receiving search criteria to search FAQs.

On the other hand, if the user selects the Search FAQs button 122 in step 6020, the controller 22 controls the display 50 in step 6070 to display an FAQ Search screen 130 as shown in FIG. 17. The user can thus enter search criteria into the search area 131 of the FAQ Search screen 130 using, for example, manual input controls 54, including voice activated controls as discussed above and/or the displayed controls 132. In step 6080, the controller 22 controls the display 50 to display an FAQ Search Results screen 140 as shown in FIG. 18.

FAQ Search Results screen 140 includes buttons, for example, button 141 that enable a user to select a particular message category, such as a fuel cap operation message 141. The user can use the manual input controls 54, including voice activated controls as discussed above, and/or displayed controls 142, as well as up arrow 143 and down arrow 144, to navigate the FAQ Search Results screen 140, to display additional buttons on the FAQ Search Results screen 140, and to select a button.

Figure 9:
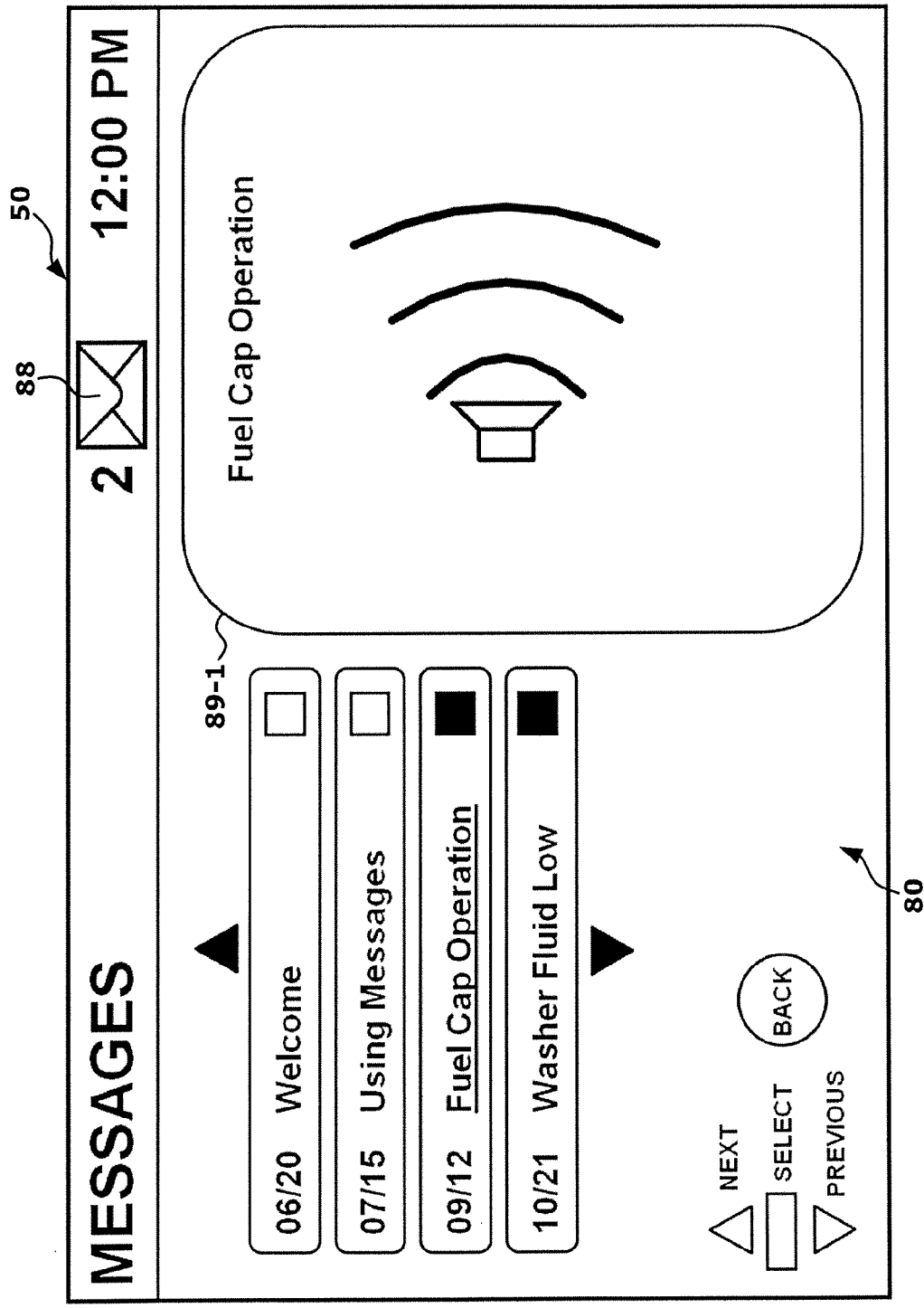
FIG. 9 is an exemplary pictorial representation of a message inbox screen for presenting messages and indicating audio presentation of the selected message.

After completing step 6050 or 6080 as discussed above, the user can select an entry from the displayed entries in step 6090. In this example, the user selected the fuel cap operation button 141 as indicated by the underline under the phrase "fuel cap operation." It should be noted that the list of entries displayed in step 6050 can be displayed in a similar manner if the user selects the FAQs option in step 6020 as discussed above. In any event, after the selection has been made in step 6090, the processing then determines in step 7000 whether vehicle safety conditions have been satisfied as discussed above with regard to steps 2060, 3040 and 4030. For example, the controller 22 can determine, based on information received from the vehicle sensors 42, whether the vehicle 14 is traveling below a threshold value (e.g., 5 mph) as the safety condition, or whether someone other than the driver is trying to access the message. If the safety condition has been met, for example, the vehicle is traveling below the threshold and/or the user trying to access the message is a passenger, the processing continues to step 7010. In step 7010, the controller 22 controls the display 50 to display a message 145 for solving an issue associated with an improperly tightened fuel cap as shown, for example, in FIG. 18. However, when the vehicle safety condition has not been met (e.g., the vehicle is not traveling below the threshold and the driver is attempting to access the messages), the processing continues to step 7020 where the controller 22 and associated components translate the message from text to speech and control the audio system 52 to audibly present the message. In this event, the controller 22 controls the display 50 to display an audio indication as discussed above with regard to FIG. 9. Naturally, when the safety condition has been met, the message can be presented in step 7010 visually and audibly.

The processing then determines in step 7030 whether another entry has been selected. If another entry has been selected, the processing returns to step 7000 and repeats as discussed above. However, if the back button has been selected, the processing returns to step 6000 and repeats as discussed above. Alternatively, the processing can return to the idle processing beginning in step 5000 as discussed above.

The HMI system 16 can further present information based on information received from the vehicle sensors 42. That is, the telematics system 10 (information system) remotely creates an information set including user accessible information pertaining to troubleshooting onboard components of the host vehicle as discussed above. The user accessible information pertaining to troubleshooting includes information pertaining to conditions of the onboard components of the host vehicle and actions associated with the conditions. As will now be discussed, the telematics system 10 is able to select a portion of the user accessible information based on a detected host vehicle condition.

Figure 19:
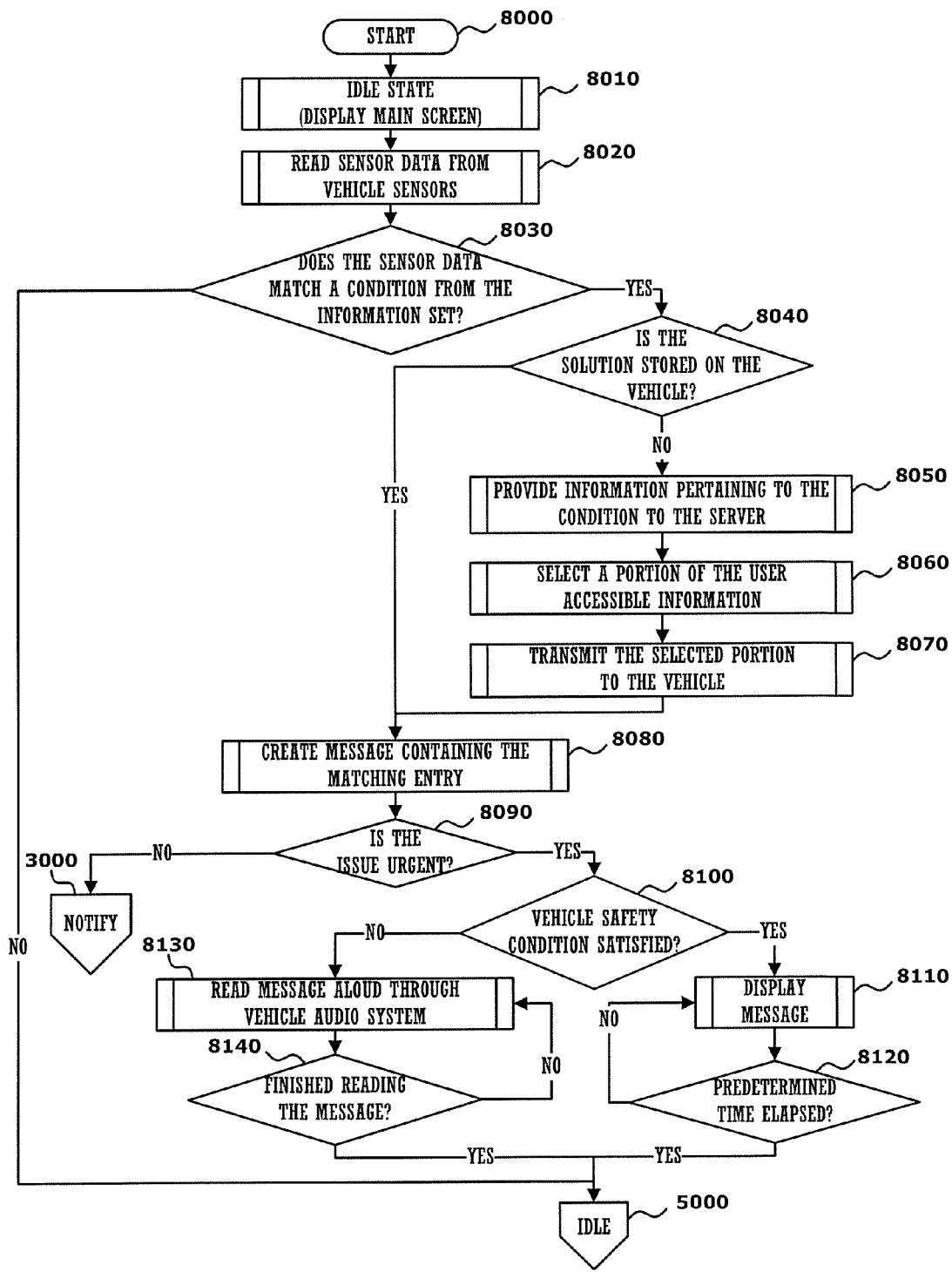
FIG. 19 is a flow chart illustrating an exemplary process for creating and presenting new messages based on vehicle condition information.

When the processing begins in step 8000 shown in FIG. 19, the user interface components (e.g., the display 50, audio system 52, manual input controls 54 and microphone 56) are in an "idle" state in step 8010, as discussed above with regard to step 5010. For example, the display 50 could be displaying a navigation map, radio channels, and other information as understood in the art.

The controller 22, for example, reads the data being received from the vehicle sensors 42 in step 8020, and thus detects a host vehicle condition. The processing then determines in step 8030 whether the sensor data indicates that a vehicle condition is occurring which matches an entry in the information set. If no such condition is occurring, the processing continues to the idle processing beginning in step 5000 as discussed above. However, if such a condition is occurring, the processing continues to step 8040 where the controller 22, for example, determines whether a potential solution to the condition is stored at the host vehicle 14. That is, the controller 22 can determine whether the portion of the information set stored in the storage component 36 on the host vehicle 14 includes information pertaining to a potential solution to the sensed condition. If the storage component 36 does not include a solution, or if it is believed that the solution could be outdated (e.g., the controller 22 can determine when the solution was last updated), the processing continues to step 8050 where the controller 22 controls the communication device 32 to transmit information pertaining to the host vehicle condition to a location at which the information set is remotely created. For instance, the communication device 32 can wirelessly transmit information pertaining to the host vehicle condition to the server that maintains the information set at the base station 18. Hence, the communication device 32 acts as a communication device that is disposed at the host vehicle 14 and configured to wirelessly communicate the host vehicle condition for receipt by the information system (e.g., the base station 18 component of the information system) before the information system (e.g., the base station 18 component of the information system) selects the portion of the user accessible information that is wirelessly communicated to the host vehicle 14.

In step 8060, the server, for example, selects a portion of the user accessible information in the information set based on the host vehicle condition. The selecting includes selecting an entry from the user accessible information pertaining to troubleshooting onboard components of the host vehicle 14 as the portion of the user accessible information that is to be wirelessly communicated to the host vehicle 14.

In step 8070, the base station 18 can operate as a communication device that wirelessly communicates the portion of the user accessible information to the host vehicle 14 for access by a user at the host vehicle 14 via the user interface a (e.g., display 50, an audio system 52, manual input controls 54 and a microphone 56) as discussed above. The base station 18 can also transmit the entirety of the information set wirelessly to the host vehicle 14. Hence, the portion or entirety of the user accessible information can be stored in, for example, the storage component 36 of the host vehicle.

The processing continues to step 8080 where a message is created that identifies the condition. Alternatively, if it is determined in step 8040 that the user accessible information containing what is believed to be a current and sufficient solution to the condition is stored at the host vehicle 14 (e.g., on the storage component 36), the processing can proceed to step 8080 without contacting the server.

If the controller 22 determines in step 8090 that the condition does not need to be addressed urgently, the processing continues to the notification processing beginning in step 3000 as discussed above, which provides the user with an option to read or ignore the message. Hence, the controller 22 can operate the user interface to present a notification of receipt of the portion of the user accessible information at the host vehicle 14. For example, the controller 22 can operate the display 50 of the user interface to display information as the notification. Alternatively, or in addition, the controller 22 can operate the audio system 52 of the user interface to emit an audible alert as the notification. For instance, the audio system 52 of the user interface can audibly read the portion of the user accessible information received at the host vehicle 14 as the notification.

On the other hand, if the controller 22 determines in step 8090 that the condition does need to be addressed urgently, the processing continues to step 8100 where the controller 22 determines whether the vehicle safety condition has been satisfied in a manner similar to that discussed above with regard to steps 2060, 3040 and 4030. If the safety condition has been met, the processing continues to step 8110. In step 8110, the controller 22 controls the display 50 to display a message in a manner as discussed above for solving the condition. Preferably, the controller 22 controls the display 50 to display the message for a predetermined amount of time in step 8120. Alternatively, the controller 22 can control the display 50 to display the message similar to the message in FIG. 8 along with the read/play button 72 and the acknowledgement button 74. However, when the vehicle safety condition has not been met, the processing continues to step 8130 where the controller 22 and associated components translate the message from text to speech and control the audio system 52 to audibly present the message. In this event, the controller 22 controls the display 50 to display an audio indication as discussed above instead of the text of the message. In step 8140, the controller determines whether the audio system 52 is finished presenting the message before continuing. Naturally, when the safety condition has been met, message can be presented in step 8110 visually and audibly. After steps 8110 and 8120 or 8130 and 8140 have been performed, as appropriate, the processing continues to the idle processing beginning in step 5000 as discussed above.

It should also be noted that a condition as discussed above with regard to the processing shown in FIG. 19 can be an issue associated with a type of peripheral device that is attempting to connect to the HMI system 16. Accordingly, the information set can include possible solutions for addressing this issue. The HMI system 16 can recognize the type of peripheral device attempting to connect to the HMI system 16, and a message addressing any issues associated with that peripheral device can be presented as discussed above with regard to FIG. 19 as for any other condition. For instance, if the HMI system 16 detects that a specific type of mobile telephone is attempting to connect to the HMI system 16, the message presented would pertain to any issues specifically relating to such a device. Furthermore, the portion of the user accessible information that the base station 18 communicates to the host vehicle 14 as discussed above would include information for addressing any issue associated with that particular type of detected device, instead of, for example, information pertaining to all types of peripheral devices. Naturally, the scope and amount of information provided can vary as appropriate.

Additionally, when detecting a host vehicle condition as discussed with regard to the processing in FIG. 19, the controller 22 can independently monitor the output of the vehicle sensors 42, and continually determine whether an existing vehicle condition matches a vehicle condition in the information set. Alternatively or additionally, the controller 22 may also detect when the "check engine" light is activated before receiving the output of the vehicle sensors to then detect the vehicle condition. The HMI system can then produce a message with a solution to the issue causing the lighting of the check engine light. The check engine light can also take the form of a selectable check engine icon on display 50, which can be selected to access a message pertaining to the vehicle condition.

In addition, as with the updating performed in FIG. 4 discussed above, the server at the base station 18, for example, can remotely update at least a portion of the user accessible information to create updated user accessible information, and can select an updated portion of the updated user accessible information based on the host vehicle condition. The remotely updating includes changing the at least a portion of the user accessible information based on information received from users of other vehicles as in step 1040.

Accordingly, the telematics system 10 discussed herein can provide improved vehicle user satisfaction by more effectively providing vehicle information and solutions to specific issues as they arise at times after purchase of the vehicle. Hence, users may be able to resolve the issue or have their questions answered before contacting the dealer or a mechanic. Also, the telematics system 10 provides timely and up-to-date information without having to send printed updates to users. Hence, users can have access to current information about their vehicle.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also, the term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A method for presenting information to a host vehicle having a user interface, the method comprising:

remotely creating an information set including user accessible information pertaining to troubleshooting onboard components of the host vehicle, the user accessible information including characteristic information indicating a respective degree of urgency of each of a plurality of data entries of the user accessible information in the information set;

wirelessly communicating to the host vehicle a portion of the information set including a group of the data entries and a portion of the characteristic information indicating the respective degree of urgency of each of the data entries in the group, with the respective degree of urgency of at least two of the data entries in the group being different from each other; and operating the user interface to manage the information set in accordance with the respective degree of urgency each of the data entries in the group based on the portion of the characteristic information, and provide a type of notification relating to those of the data entries in the group for which the respective degree of urgency is at least equal to a prescribed degree of urgency to selectively make available those of the data entries for access in response to the notification at the host vehicle while refraining from providing a notification relating to the data entries in the group for which the respective degree of urgency is less than the prescribed degree of urgency.

2. The method according to claim 1, further comprising remotely updating at least a portion of the user accessible information to create updated user accessible information;

wirelessly communicating the updated user accessible information to the host vehicle; and updating the information set at the host vehicle based on the updated user accessible information.

3. The method according to claim 2, wherein the remotely updating includes changing the at least a portion of the user accessible information based on information received from users of other vehicles.

4. The method according to claim 1, further comprising selecting an entry from the user accessible information pertaining to troubleshooting onboard components of the host vehicle as the portion of the information set that is wirelessly communicated to the host vehicle.

5. The method according to claim 1, wherein the wirelessly communicating communicates an entirety of the information set as the portion to the host vehicle.

6. The method according to claim 1, further comprising remotely creating a second information set including user accessible information pertaining to troubleshooting onboard components of the host vehicle;

wirelessly communicating a portion of the second information set to the host vehicle; and replacing the portion of the information set at the host vehicle with the portion of the second information set wirelessly communicated to the host vehicle.

7. The method according to claim 1, wherein the operating includes operating the user interface to provide notification of receipt of the portion of the information set at the host vehicle as the type of notification based on the degree of urgency as interpreted by the user interface.

8. The method according to claim 7, wherein the notification includes operating the user interface to at least one of visually display a notification as the type of notification and emit an audible alert as the type of notification.

9. The method according to claim 7, wherein the notification includes operating the user interface to audibly read the portion of the information set received at the host vehicle as the type of notification.

10. The method according to claim 1, wherein the user accessible information pertaining to troubleshooting includes information pertaining to conditions of the onboard components of the host vehicle and actions associated with the conditions.

11. The method according to claim 1, further comprising determining whether the vehicle meets a safety condition, and the operating of the user interface includes presenting the notification while the safety condition is met and refraining from presenting the notification while the safety condition is not met.

12. The method according to claim 1, wherein information in those of the data entries for which the respective degree of urgency is at least equal to the prescribed degree of urgency is available for access beginning at a time the notification is provided; and information in the data entries in the group for which the respective degree of urgency is less than the prescribed degree of urgency is stored, and made available for access independently of the notification and the time that the notification is provided.

13. A system for presenting information to a host vehicle, the system comprising:

an information system configured to remotely create an information set including user accessible information pertaining to troubleshooting onboard components of the host vehicle, a portion of the user accessible information including characteristic information indicative of a respective degree of urgency of each of a plurality of data entries of the user accessible information in the information set, and the information system being further configured to wirelessly communicate to the host vehicle a group of the data entries and a portion of the characteristic information indicating the respective degree of urgency of each of the data entries in the group, with the respective degree of urgency of at least two of the data entries in the group being different from each other; and a user interface system disposed at the host vehicle and configured to receive the portion of the information set communicated by the information system manage the portion of the information set in accordance with the respective degree of urgency of each of the data entries in the group based on the portion of the characteristic information, and provide a type of notification relating to those of the data entries in the group for which the respective degree of urgency is at least equal to a prescribed degree of urgency to selectively present those of the data entries for access in response to the notification at the host vehicle while refraining from providing a notification relating to the data entries in the group for which the respective degree of urgency is less than the prescribed degree of urgency.

14. The system according to claim 13, wherein the information system is further configured to remotely update at least a portion of the user accessible information to create updated user accessible information and to wirelessly communicate the updated user accessible information to the host vehicle; and the user interface system is further configured to update the information set at the host vehicle based on the updated user accessible information.

15. The system according to claim 14, wherein the remote updating by the information system includes changing the at least a portion of the user accessible information based on information received from users of other vehicles.

16. The system according to claim 13, wherein the user interface system includes at least one of a display, an audio system, and an input device, configured to selectively present a portion of the user accessible information as the type of notification.

17. The system according to claim 16, wherein at least one of the display is configured to visually present the portion of the user accessible information as the type of notification and the audio system is configured to audibly present the portion of the user accessible information as the type of notification.

18. The system according to claim 13, wherein the user accessible information pertaining to troubleshooting includes information pertaining to conditions of the onboard components of the host vehicle and actions associated with the conditions.

19. The system according to claim 13, wherein
the user interface system is configured to determine whether the vehicle meets a safety condition, and to present the notification while the safety condition is met and refrain from presenting the notification while the safety condition is not met.

20. The system according to claim 13, wherein
information in those of the data entries for which the respective degree of urgency is at least equal to the prescribed degree of urgency is available for access beginning at a time the notification is provided; and information in the data entries in the group for which the respective degree of urgency is less than the prescribed degree of urgency is stored, and made available for access independently of the notification and the time that the notification is provided.

* * * * *